(12) United States Patent
Douer

(10) Patent No.: US 11,102,992 B2
(45) Date of Patent: Aug. 31, 2021

(54) UNIVERSAL, REFRIGERATED, AUTOMATED VENDING KIOSK FOR INTERCHANGEABLE EQUIPMENT SERVING SOFT SERVE ICE CREAM AND FROZEN BEVERAGES

(71) Applicant: Morris Douer, Monsey, NY (US)

(72) Inventor: Morris Douer, Monsey, NY (US)

(73) Assignee: KeepvendingUSA Holdings LLC, Nanuet, NY (US)

( * ) Notice: Subject to any disclaimer, the term of this patent is extended or adjusted under 35 U.S.C. 154(b) by 107 days.

(21) Appl. No.: 16/201,277

(22) Filed: Nov. 27, 2018

(65) Prior Publication Data

US 2019/0166874 A1    Jun. 6, 2019

Related U.S. Application Data

(60) Provisional application No. 62/707,994, filed on Nov. 27, 2017, provisional application No. 62/704,024, filed on Oct. 5, 2018.

(51) Int. Cl.
| | |
|---|---|
| *A23G 9/28* | (2006.01) |
| *A23G 9/30* | (2006.01) |
| *G07F 17/00* | (2006.01) |
| *A23G 9/22* | (2006.01) |
| *H02J 3/14* | (2006.01) |
| *H02J 3/12* | (2006.01) |

(52) U.S. Cl.
CPC ............... *A23G 9/28* (2013.01); *A23G 9/22* (2013.01); *A23G 9/30* (2013.01); *G07F 17/0071* (2013.01); *H02J 3/12* (2013.01); *H02J 3/14* (2013.01); *H02J 3/144* (2020.01)

(58) Field of Classification Search
CPC .... A23G 9/28; A23G 9/30; A23G 9/22; H02J 3/144; H02J 3/14; G07F 17/0071
USPC .................................................. 700/231–244
See application file for complete search history.

(56) References Cited

U.S. PATENT DOCUMENTS

| | | | | |
|---|---|---|---|---|
| 6,243,626 | B1 * | 6/2001 | Schanin | G07F 9/02 700/286 |
| 6,389,822 | B1 * | 5/2002 | Schanin | F25D 29/00 62/89 |
| 6,801,836 | B2 * | 10/2004 | Schanin | H05B 47/11 700/295 |
| 6,975,926 | B2 * | 12/2005 | Schanin | H02J 9/005 700/296 |
| 7,200,467 | B2 * | 4/2007 | Schanin | H02J 9/005 700/231 |

(Continued)

*Primary Examiner* — Michael Collins

(57) ABSTRACT

A vending machine for dispensing both soft-serve ice cream and frozen ice-cream-based beverages to consumers. The machine includes a power management system having a controller, a master relay for controlling power supplied to a first component, slave relays for controlling power supplied to second and third components, and a current sensor for sensing a current draw of the machine. The machine also includes a flavoring plate for providing flavoring to a dispensed ice cream product. The plate includes an orifice for extruding the product, a channel extending around the orifice, two or more ports in fluid communication with the channel, and one or more gates in communication with the channel and the orifice. Each of two or more ports is configured to introduce one of a flavoring fluid or a cleaning fluid to the channel.

20 Claims, 39 Drawing Sheets

(56) References Cited

U.S. PATENT DOCUMENTS

| | | | | |
|---|---|---|---|---|
| 7,228,989 | B2* | 6/2007 | Bhatti | F25B 5/02 |
| | | | | 221/150 R |
| 7,286,907 | B2* | 10/2007 | Schanin | F25D 29/00 |
| | | | | 700/300 |
| 10,822,251 | B1* | 11/2020 | Chandler, Jr. | C02F 1/78 |
| 10,829,388 | B1* | 11/2020 | Chandler, Jr. | C02F 1/008 |
| 2004/0112070 | A1* | 6/2004 | Schanin | G07F 9/02 |
| | | | | 62/132 |
| 2008/0140565 | A1* | 6/2008 | DeBenedetti | G07F 17/0014 |
| | | | | 705/39 |

* cited by examiner

UNIVERSAL, REFRIGERATED, AUTOMATED VENDING KIOSK FOR INTERCHANGEABLE EQUIPMENT SERVING SOFT SERVE ICE CREAM AND FROZEN BEVERAGES

RELATED APPLICATIONS

This application claims priority under 35 U.S.C. § 119(e) to U.S. Provisional Patent Application No. 62/707,994, entitled "A Universal & Refrigerated, Automated Vending Kiosk For Interchangeable Equipment Such As Soft Serve or Frozen Drinks" and filed on Nov. 27, 2017, and to U.S. Provisional Patent Application No. 62/704,024, entitled "A Universal, Refrigerated, Automated Vending Kiosk For interchangeable Equipment Serving Soft Ice Cream And Frozen Beverages" and filed on Oct. 5, 2018, Each of these provisional patent applications is hereby incorporated by reference in its entirety herein.

FIELD OF THE INVENTION

This disclosure relates generally to automated vending machines and kiosks, and more particularly, relates to automated vending machines and kiosks that are configured to dispense one or more of soft-serve ice cream or frozen ice-cream-based beverages.

BACKGROUND OF THE INVENTION

Prior art vending machines for dispensing soft-serve ice cream or frozen ice-cream-based beverages typically have power and space requirements that exceed the power and space available to more conventional food and beverage vending machines. Since real estate is generally, limited, smaller machines are desirable. Available power is often limited to a standard 110 volt 15 amp service, which fails to meet the current requirements for most prior art machines.

Maintenance of prior art vending machines has proven can be costly, and reduce profit margins Operators wish to avoid frequent visits and cumbersome, labor-intensive sanitation requirements. Repairs should be accomplished quickly and without substantial disassembly of the machines.

Prior art ice cream vending machines are known. U.S. Pat. No 4,009,740 to Michielli, which is hereby incorporated by reference in its entirety herein, discloses an. ice cream dispensing machine with a cone or cup elevator system. U.S. Pat. No. 7,448,516 to Davis, which is hereby incorporated by reference in its entirety herein, discloses an ice cream vending machine with bags of ice cream mix injecting ice cream straight into the frozen cylinders. Both of these patents disclose soft serve vending machines which are built with the ice cream-making components as integrated parts of the entire machine, Neither patent specifically addresses cleaning procedures, including any solution to the drip of melted ice cream from the ice cream nozzle at the completion of a vending cycle.

U.S. Pat. No. 7,448,516 discloses injecting syrup flavors with reference to illustration (60). The flavoring method disclosed however will not flavor the entire ice cream product, but instead will concentrate the flavor at some portion. It will also likely leave residue and remnants of previously-injected flavors which may undesirably be incorporated in a subsequent ice cream product provided to a next customer. Both prior art patents fail to disclose machines that rotate the cup in order to fill the entire cup.

In the current state of the art, more advanced kiosk-style machines by manufacturers such as ROBOFUSION of Charleston, S.C. incorporate a robotic arm to serve the ice cream. The kiosks are large in size, expensive and require an electrical service rated at 220 volts and 20 amps. A yogurt vending machine provided by Stoelting Foodservice Equipment of Kiel, Wis. is also quite large, is rated at 220 Volts and 20 amps and is difficult and time-consuming to clean.

SUMMARY OF THE INVENTION

Aspects of the present disclosure are directed to a vending machine or kiosk for dispensing both soft-serve ice cream and frozen ice-cream-based beverages. In contrast to prior art soft-serve ice cream vending machines, the disclosed vending machine is configured with a footprint and power requirements that are within the boundaries available for conventional food and beverage vending machines. The disclosed vending machine includes a flavoring system that enables multiple flavorings to be evenly introduced into the ice cream product, and incorporates a cleaning feature that eliminates remnants that could contaminate subsequently-delivered ice cream products. In addition, the disclosed vending machine further includes a power management system that regulates the activation of individual system components in a manner that enables the system to be powered by a conventional 110 volt 15 amp service.

BRIEF DESCRIPTION OF THE DRAWINGS

A more complete understanding of the present disclosure may be realized by reference to the accompanying drawing in which:

FIG. 4-B provides a schematic diagram depicting a partial front view of the automated vending kiosk of FIG. 1;

FIG. 4-C provides a schematic diagram depicting an invention plunger actuator swivel device according to aspects of the present invention.

FIG. 4-D further depicts elements of the invention plunger actuator swivel device of FIG. 4-C;

FIG. 4-E further depicts the invention plunger actuator swivel device of FIG. 4-C;

FIG. 4-F provides another schematic diagram depicting a front view of the automated vending kiosk of FIG. 1;

FIG. 4-G provides a perspective diagram depicting a front view of an automated vending kiosk in accordance with additional aspects of the present disclosure FIG. 4-H provides a schematic diagram depicting the automated vending kiosk of FIG. 4-G, with a front door of the kiosk in an open position to reveal interior components of the kiosk;

FIG. 4-I provides a schematic diagram further depicting a partial front view of the kiosk of FIG. 4-G;

FIG. 4-J depicts a mixer component of the automated vending kiosk of FIG. 4-G;

FIG. 4-K provides a schematic diagram further depicting the mixer component of FIG. 4-J;

FIG. 4-L depicts a cleaning funnel and wash assembly according to aspects of the present disclosure;

FIG. 4-M provides another view of the cleaning funnel and wash assembly of FIG. 4-L;

FIG. 4-N provides yet another view of the cleaning funnel and wash assembly of FIG. 4-L;

FIG. 6-A provides another view of the kiosk of FIG. 6;

FIGS. 10-B through 10-D illustrate elements of the topping dispenser system of FIG. 10-A;

FIGS. 11-B and 11-C further illustrate the flavoring plate of FIG. 11-A;

The illustrative embodiments are described more fully by the Figures and detailed description. The inventions may, however, be embodied in various forms and are not limited to specific embodiments described in the Figures and detailed description. For example, while embodiments are described with reference to a municipal beach badging application, the invention is not so limited and may be readily applied to many other municipal badging and similar applications.

DETAILED DESCRIPTION OF THE INVENTION

The following merely illustrates the principles of the disclosure. It will thus be appreciated that those skilled in the art be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventors to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
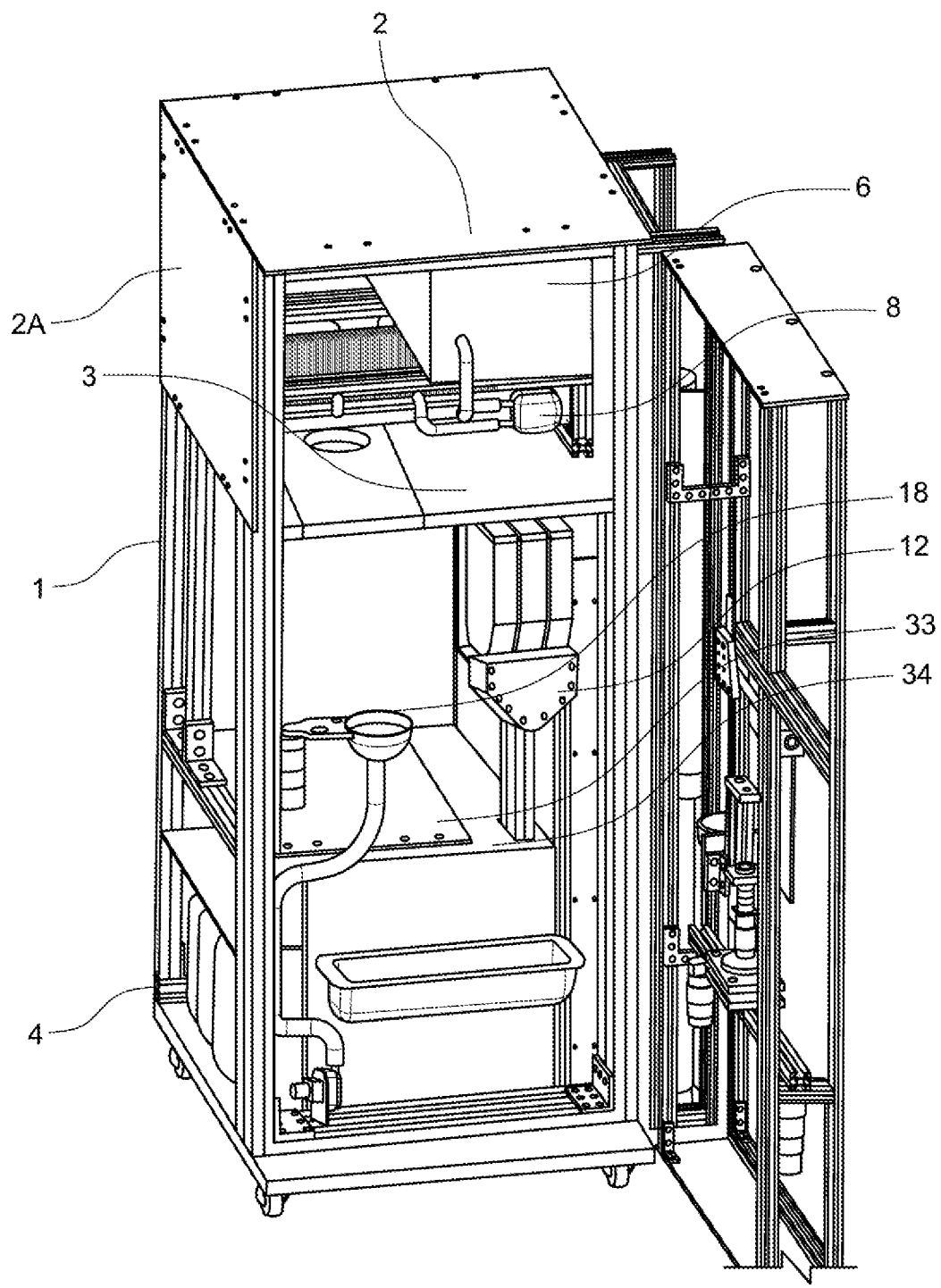
FIG. 1 provides a perspective diagram depicting a front view of an automated vending kiosk in accordance with aspects of the present disclosure.
Figure 1A:
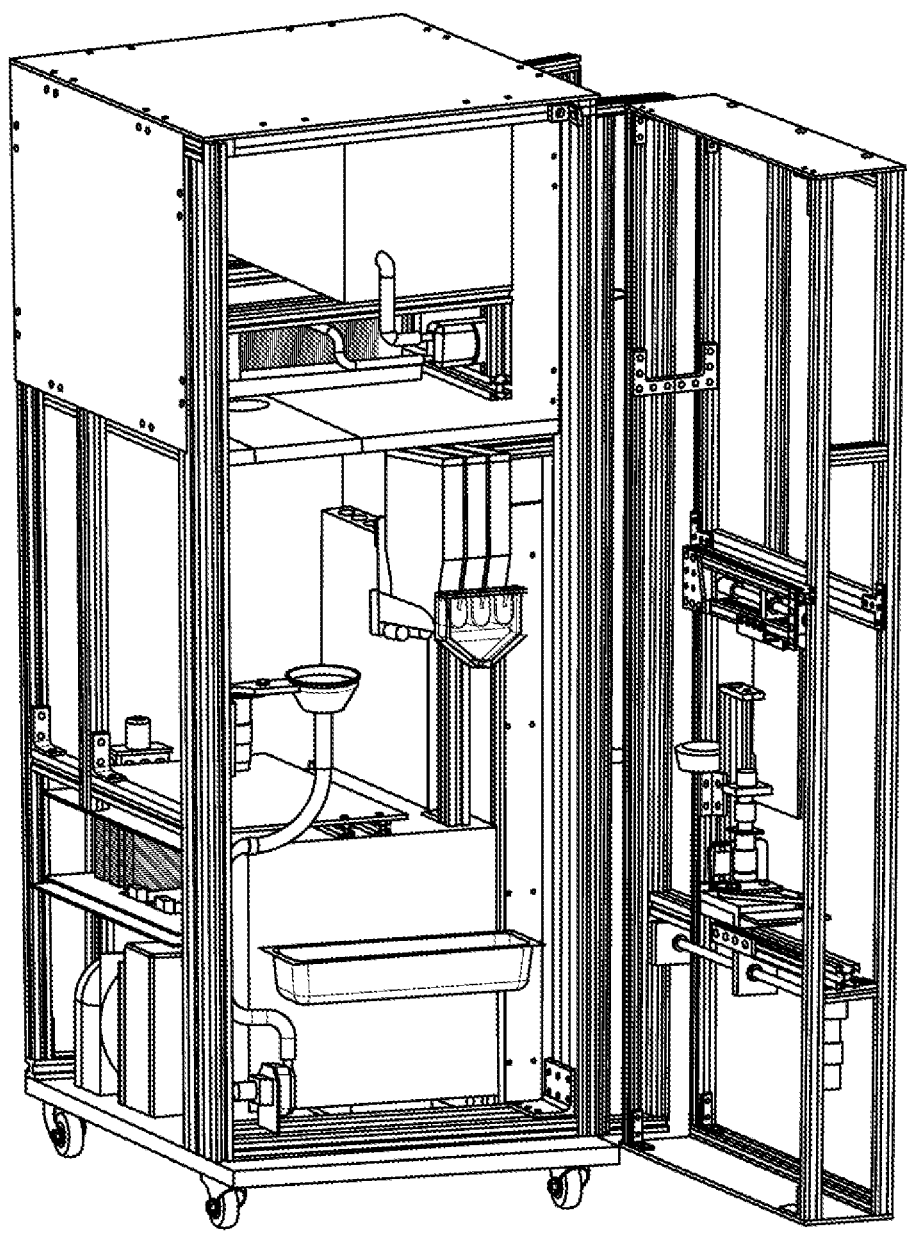
FIG. 1A provides another schematic diagram depicting a front view of the automated vending kiosk of FIG. 1.

FIG. 1 provides a perspective view of a frame for an automated vending kiosk, made of aluminum extrusions such are available from 80/20 Inc. of Columbia City, Ind. Such frame may be altered with minimal costs and parts to accommodate custom needs in the vending food service business, and without affecting the rest of the structure. The upper part of the frame (2) as depicted in FIG. 1 may be insulated with high density foam and inner/outer stainless steel panels (2-A). A bottom insulated portion of an upper refrigerated cavit which may for example seal the refrigerated cavity partially against the upper body of an installed ice cream dispenser or frozen drink dispenser is shaped and sized based on the equipment placed underneath the refrigerated cavity (3). A third party ice cream machine (75) and frozen drink machine (26) as shown in FIG. 4-A (26) are two of many types of food vending units which may be provided in the frame (2).

The upper refrigeration unit (3) preferably utilizes an enclosed off-the-shelf refrigeration deck as may be provided for large bottle beverage vending machines. A Condensing Unit (4) is provided in a lower section of the Frame, while an evaporator (5) is extended and placed in the upper insulated cavity (3). A so-called Bag-N-Box system (6) for Ice Cream Mix preferably provides rrlix to the ice cream machine (75) via a peristaltic pump (8).

Figure 3:
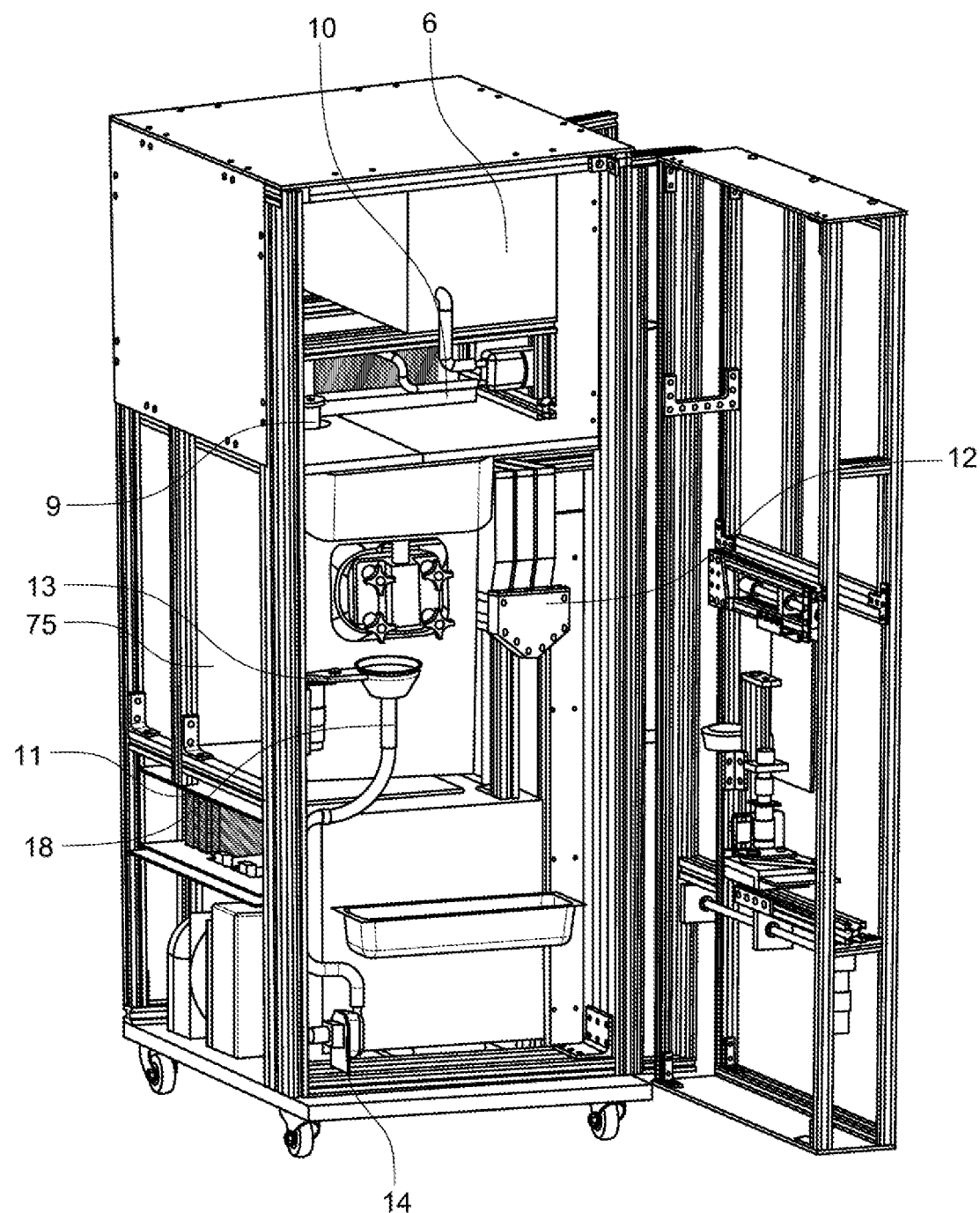
FIG. 3 provides another schematic diagram depicting a front view of the automated vending kiosk of FIG. 1.
Figure 4A:
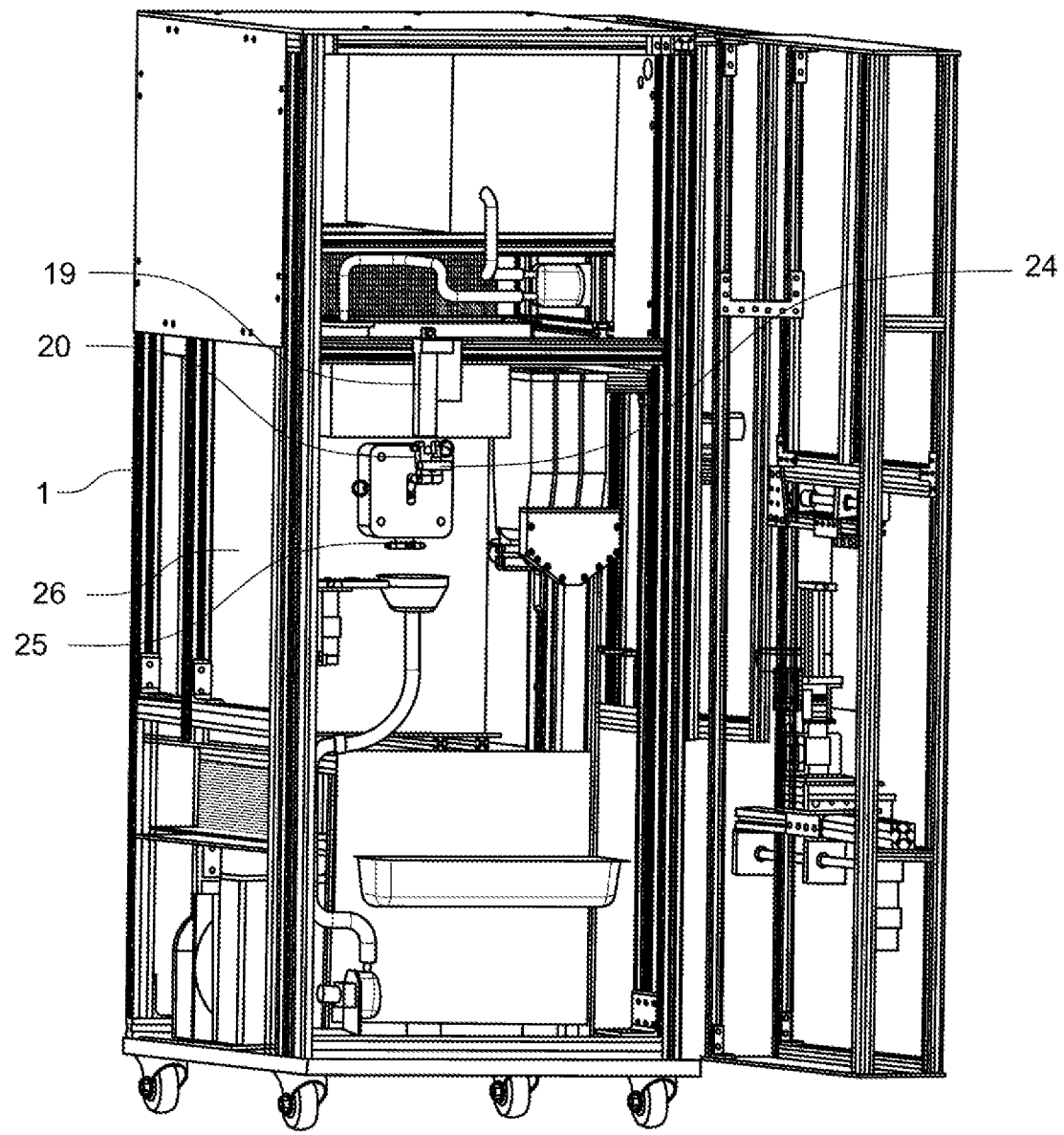
FIG. 4-A provides another schematic diagram depicting a front view of the automated vending kiosk of FIG. 1.
Figure 4B:
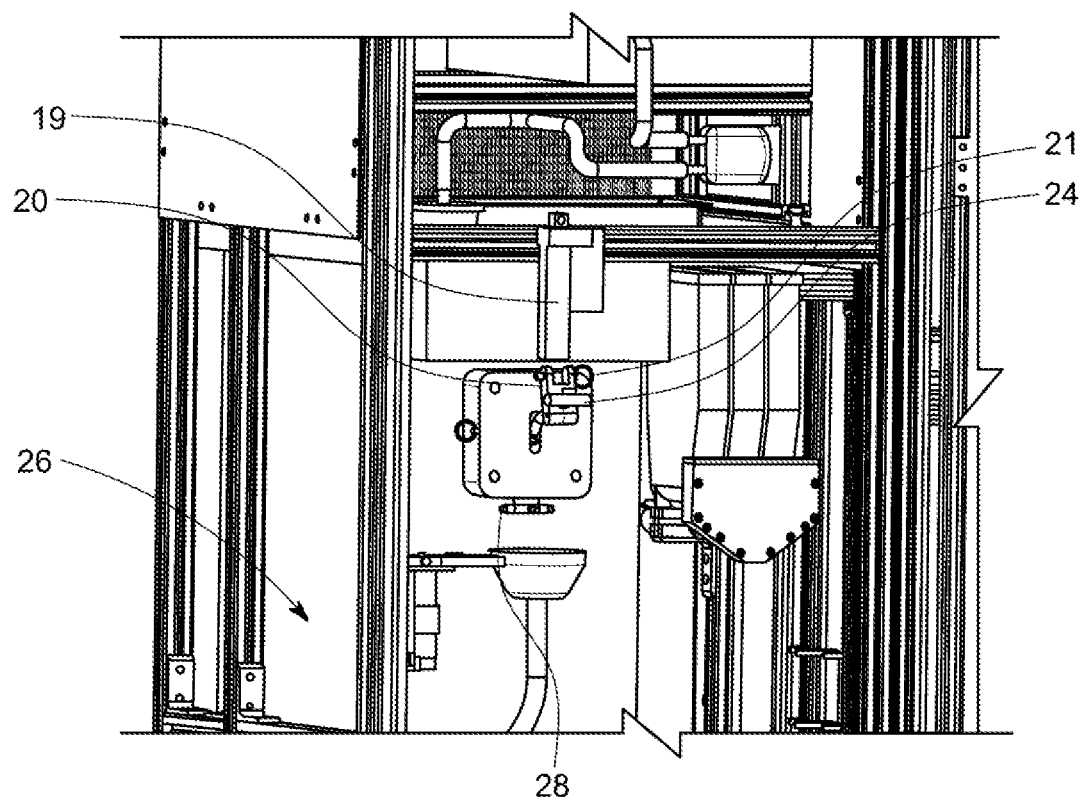
Figure 4C:
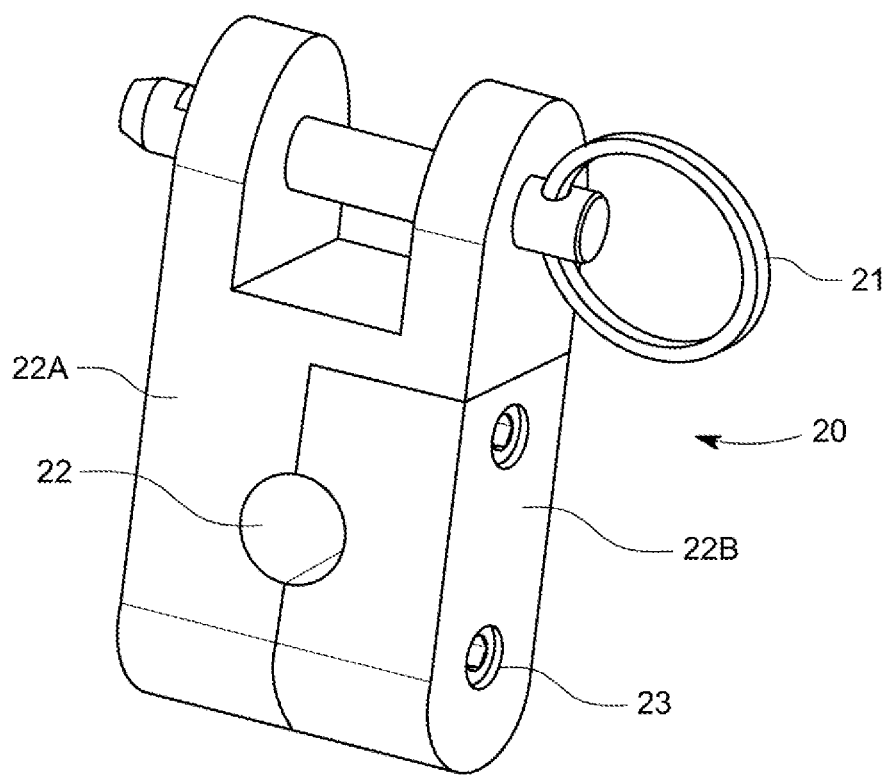
Figure 4D:
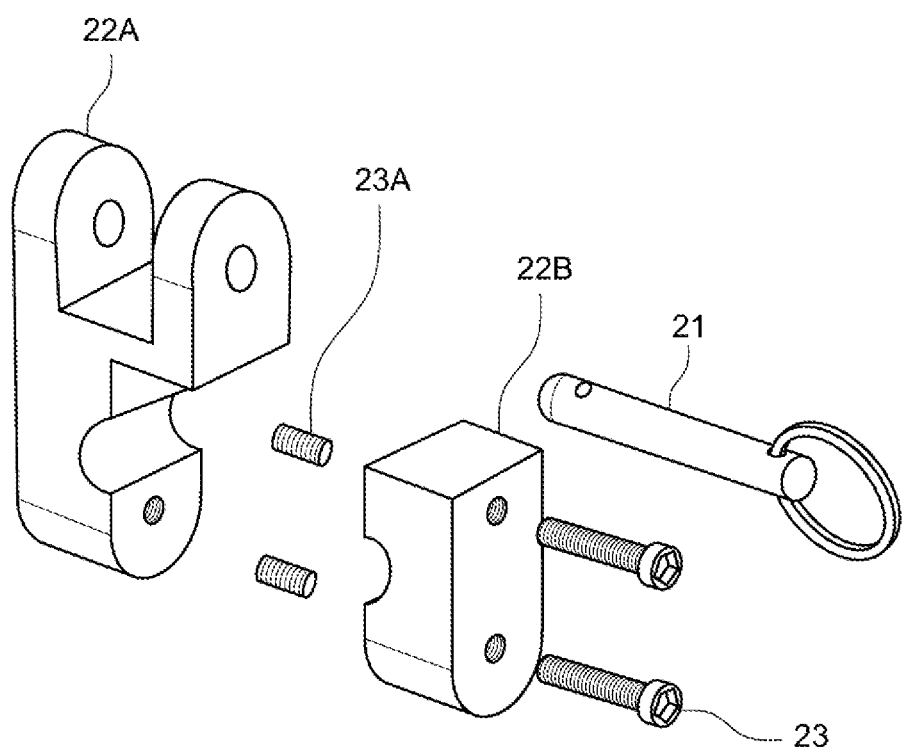
Figure 4E:
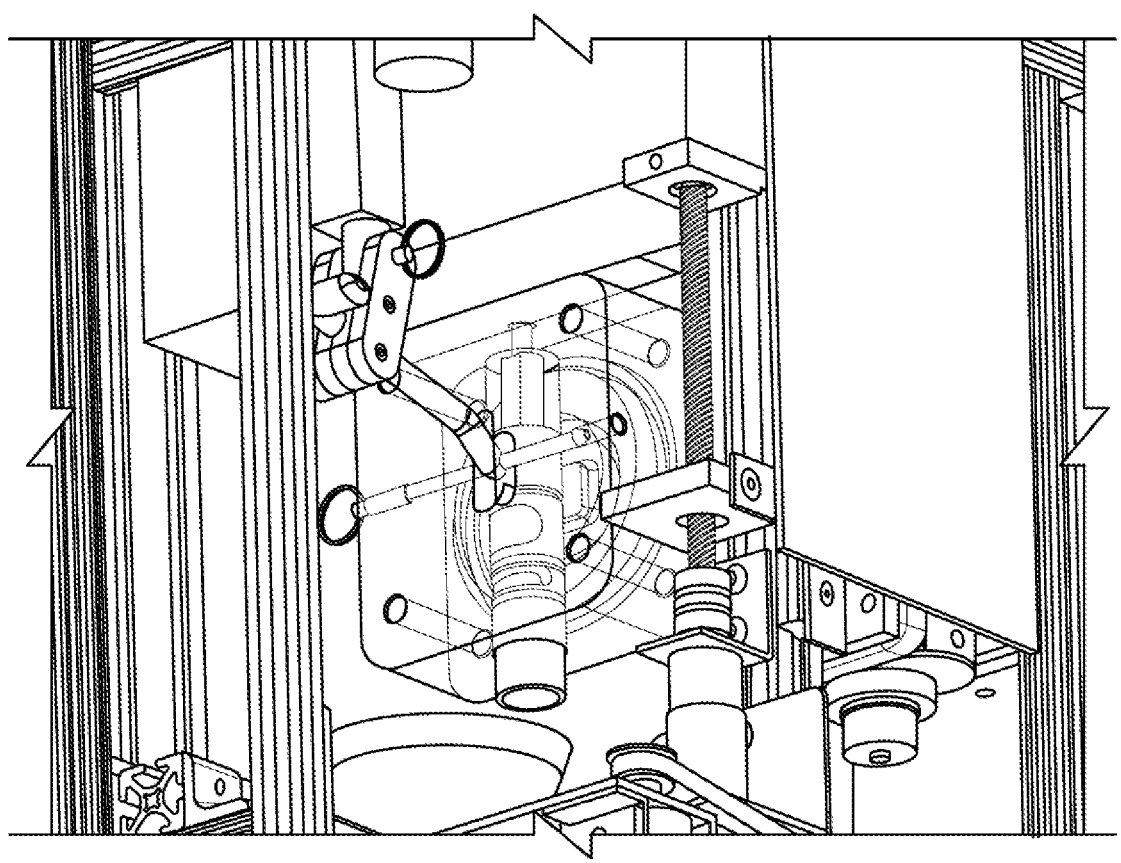
Figure 4F:
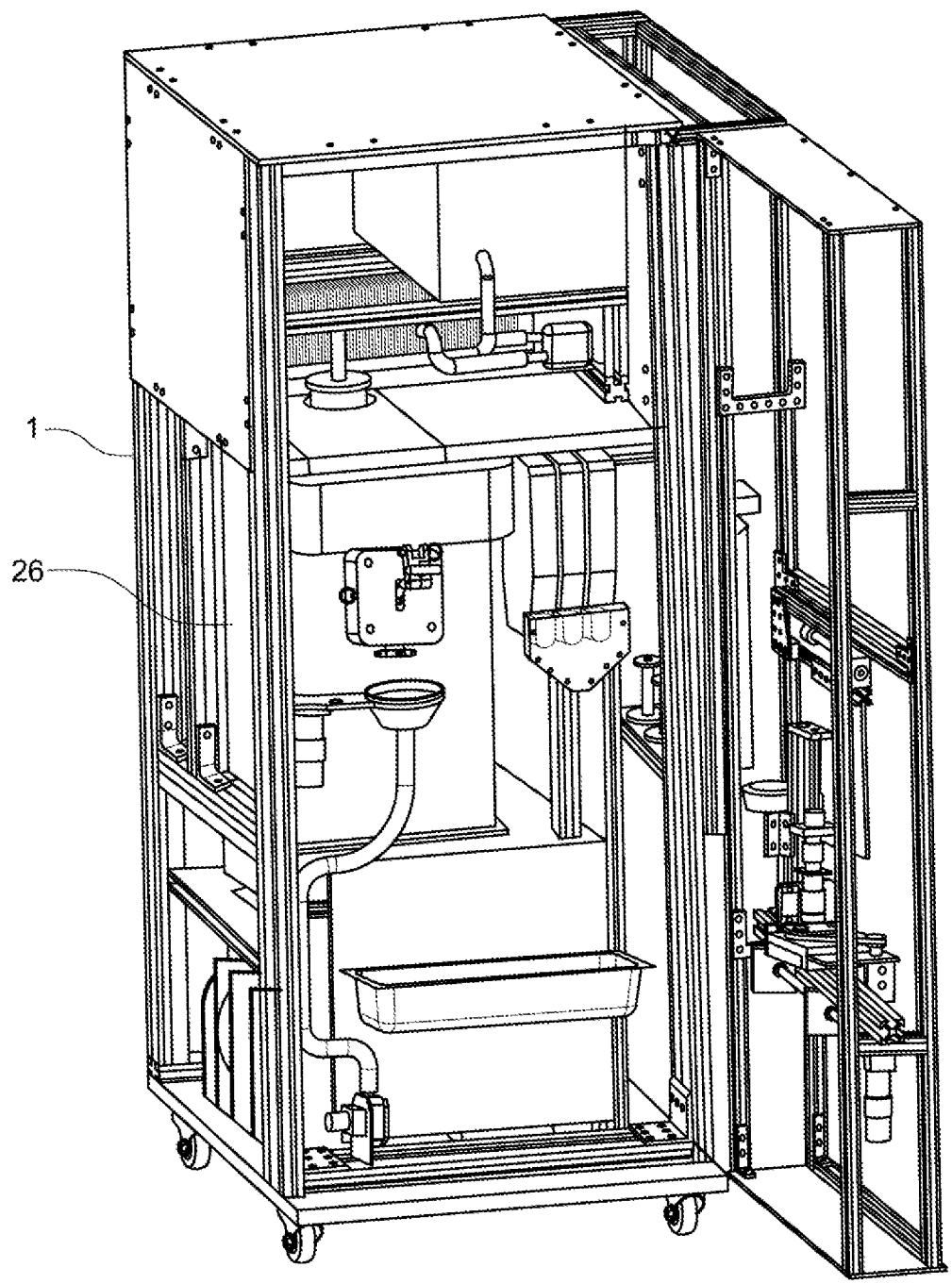
Figure 4G:
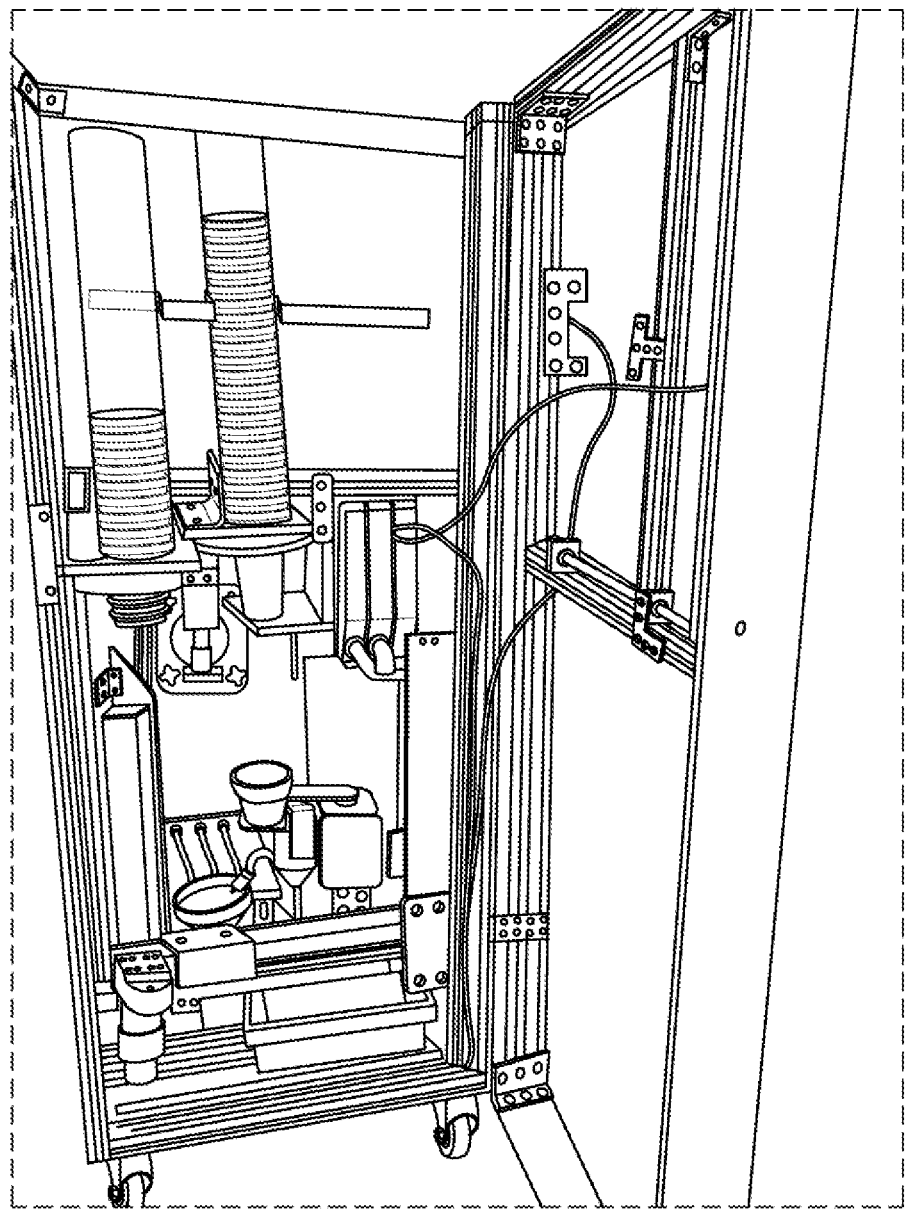
Figure 4H:
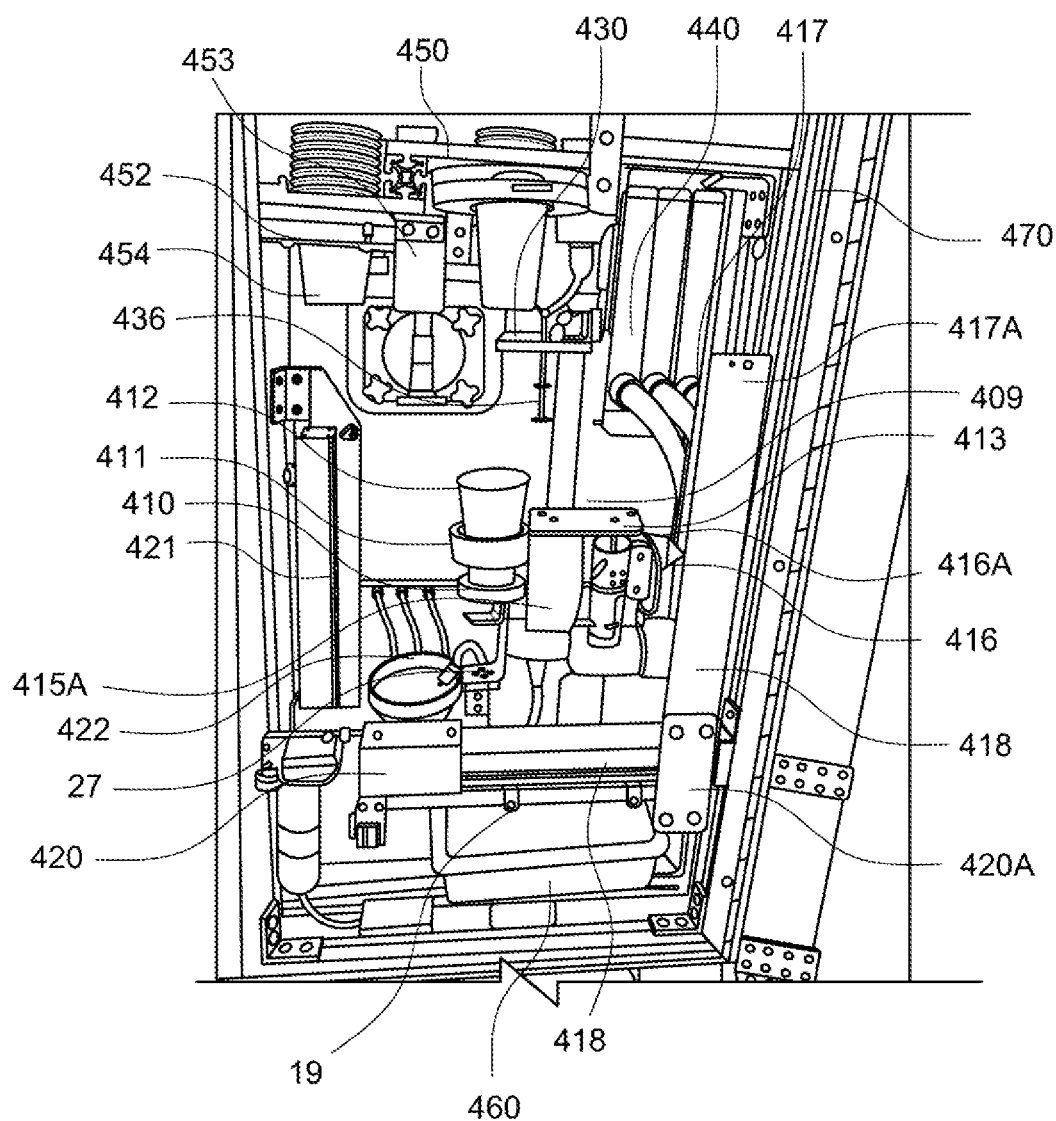
Figure 4I:
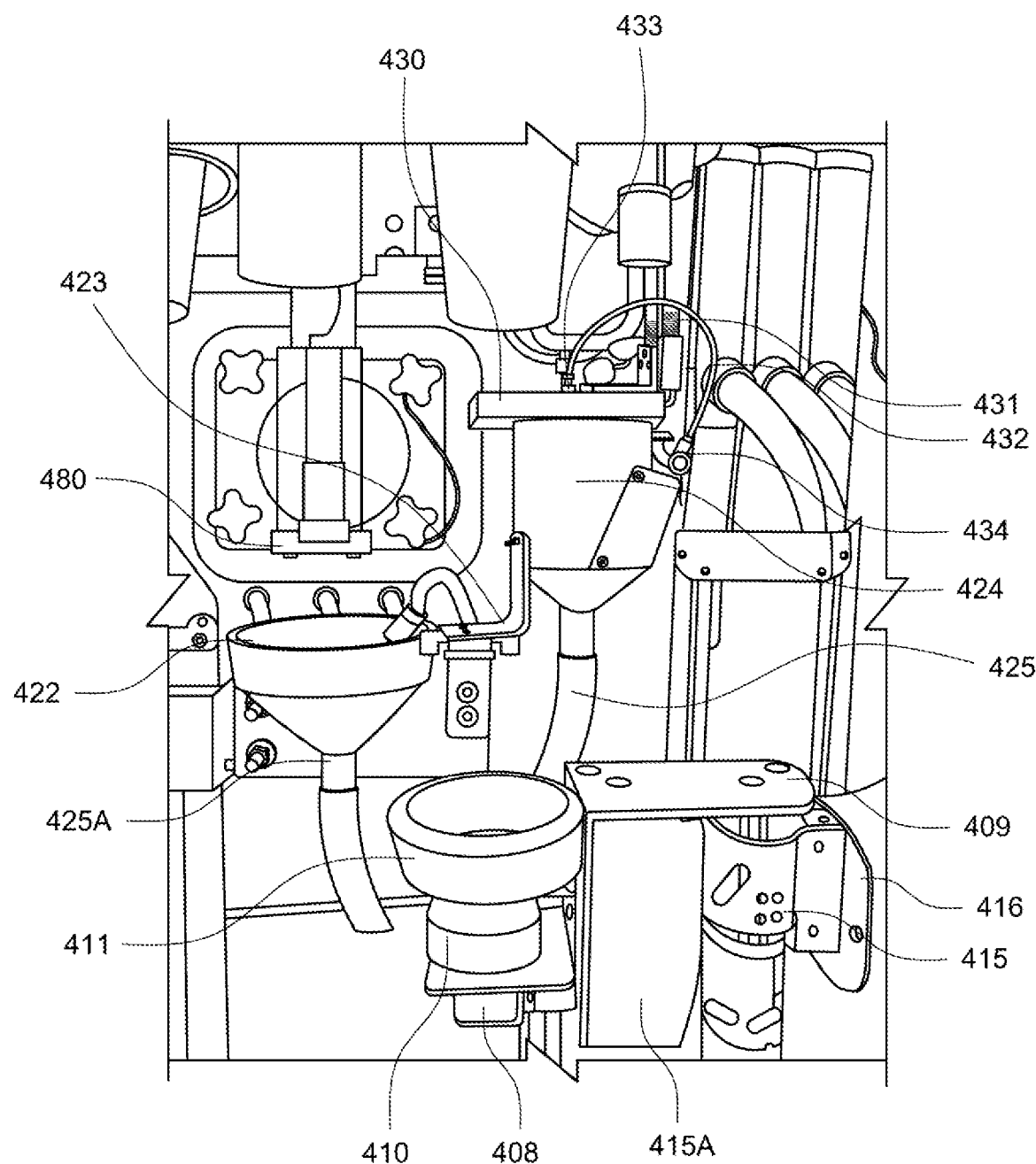
Figure 4J:
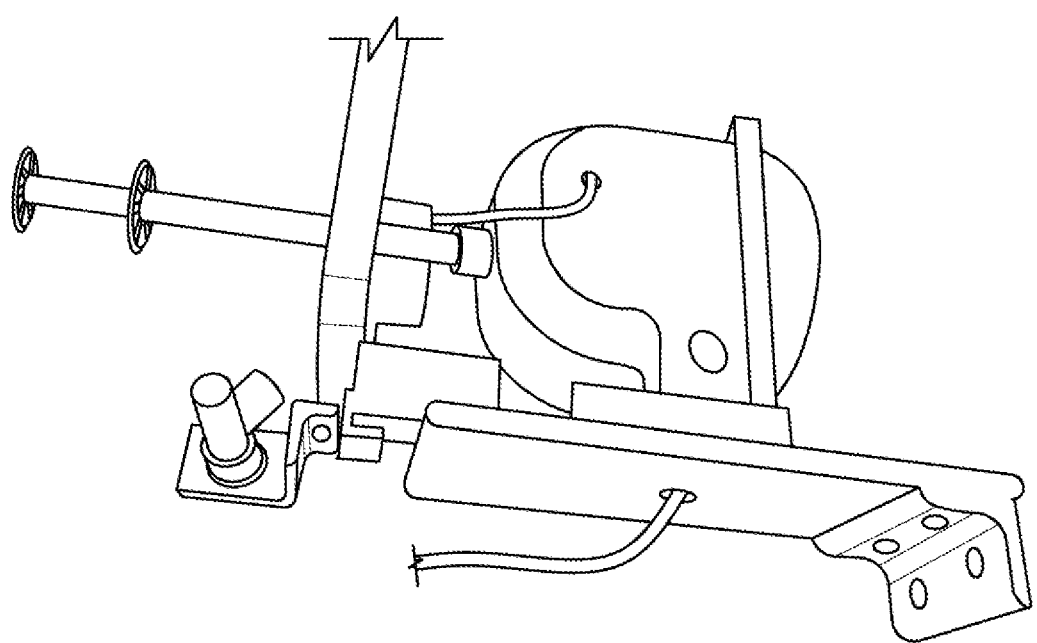
Figure 4K:
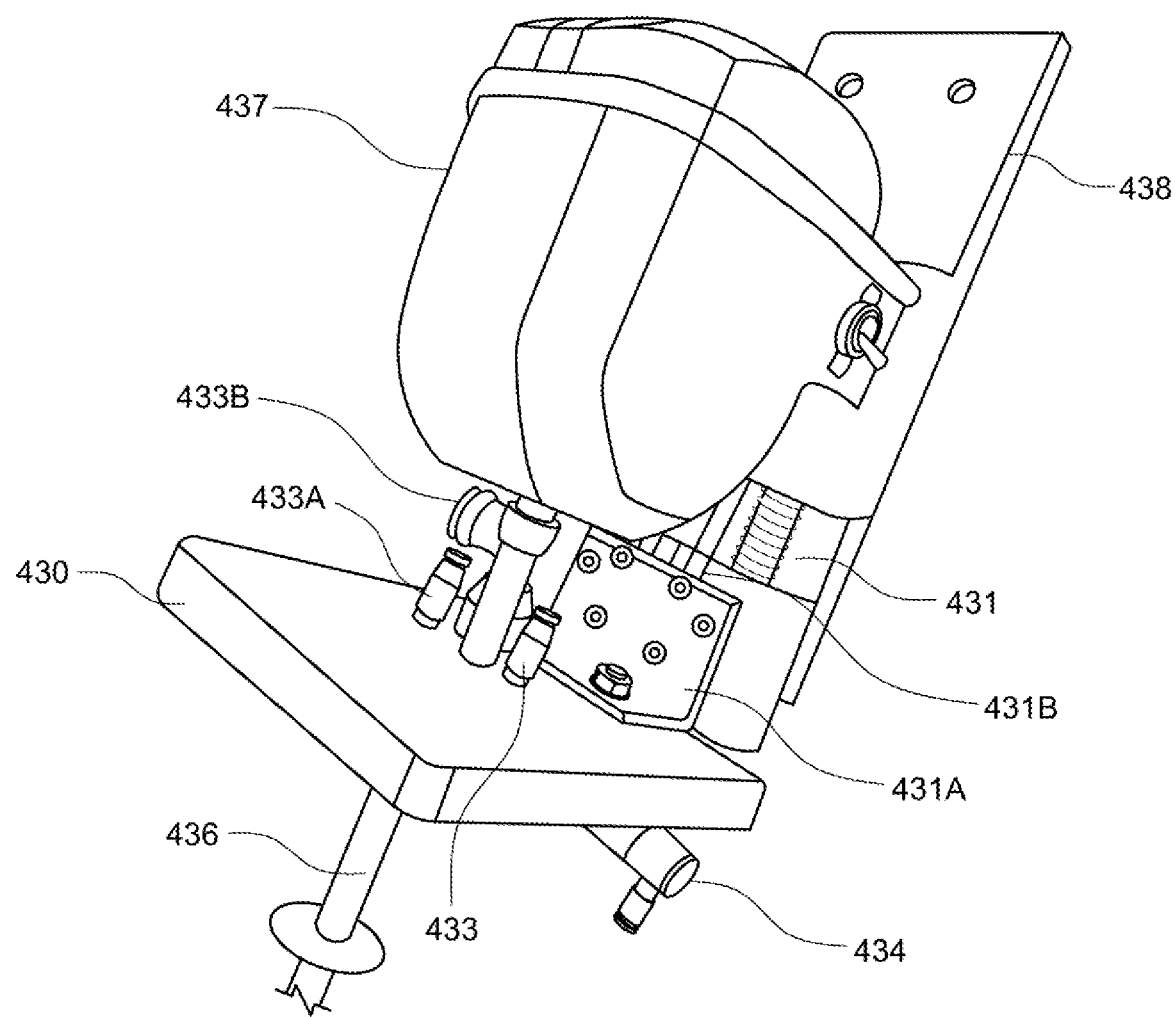
Figure 4L:
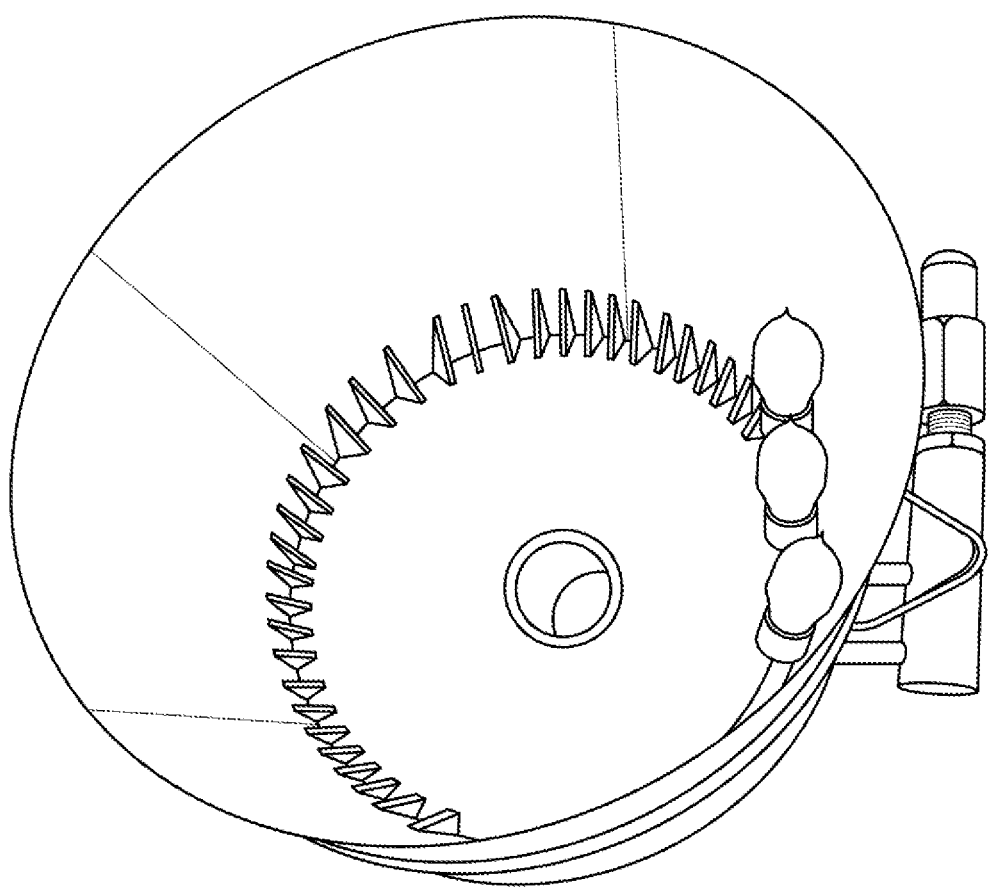
Figure 4M:
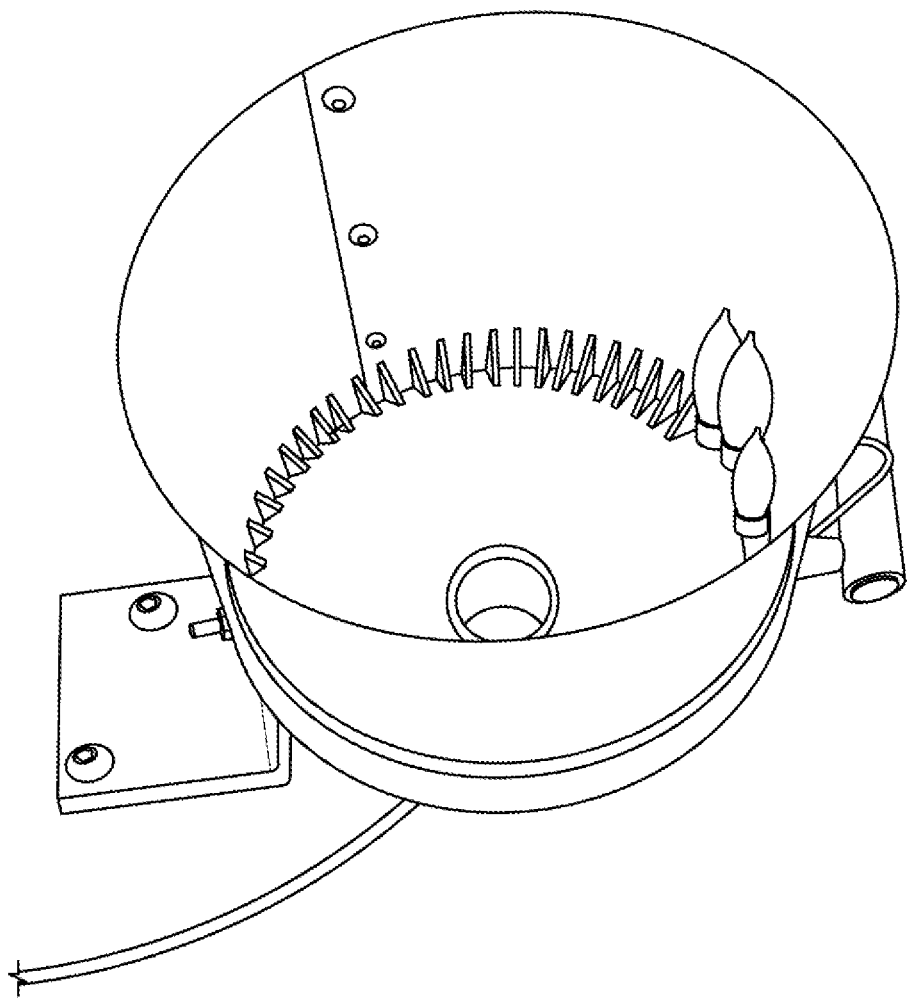
Figure 4N:
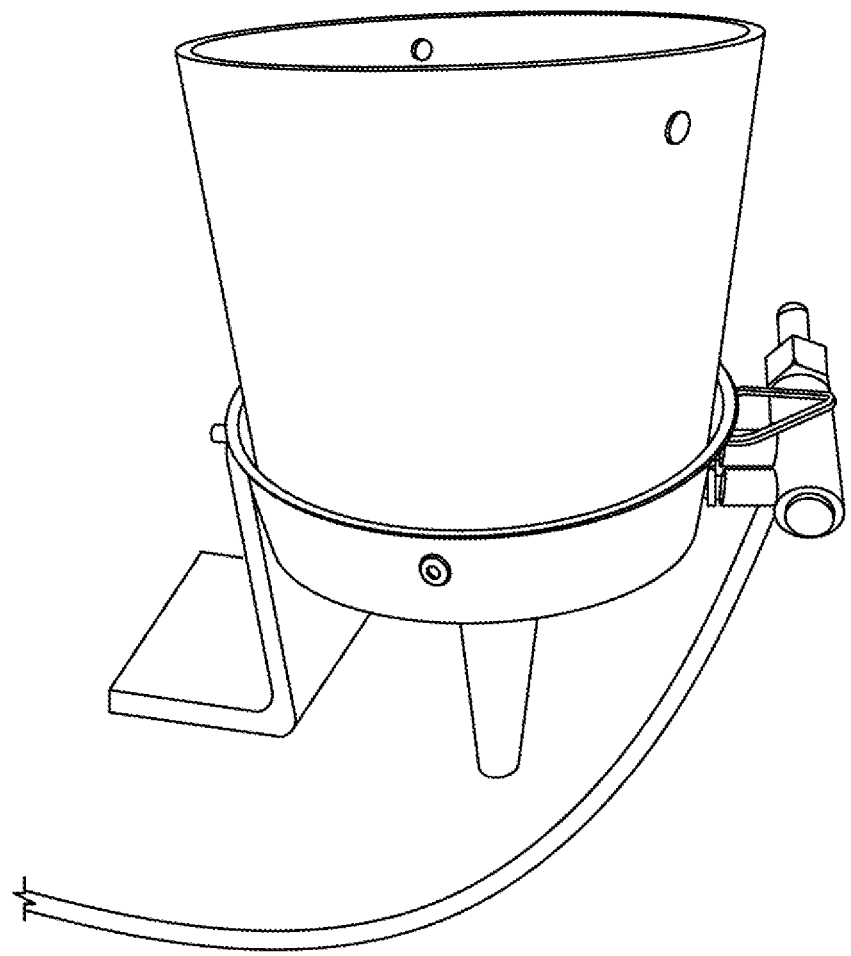

As illustrated for example in FIGS. 1, 3 and 4-A, the Ice Cream Maker (75) or frozen drink maker (26) sit on their own fixed plate (33), which is bolted to the base plate (34). In case one of these units malfunctions, it may be easily and economically removed and replaced without having to pull the entire machine out of its location, or repairing the unit on site. FIG. 1-A illustrates the frame (2) with the units removed.

Figure 2:
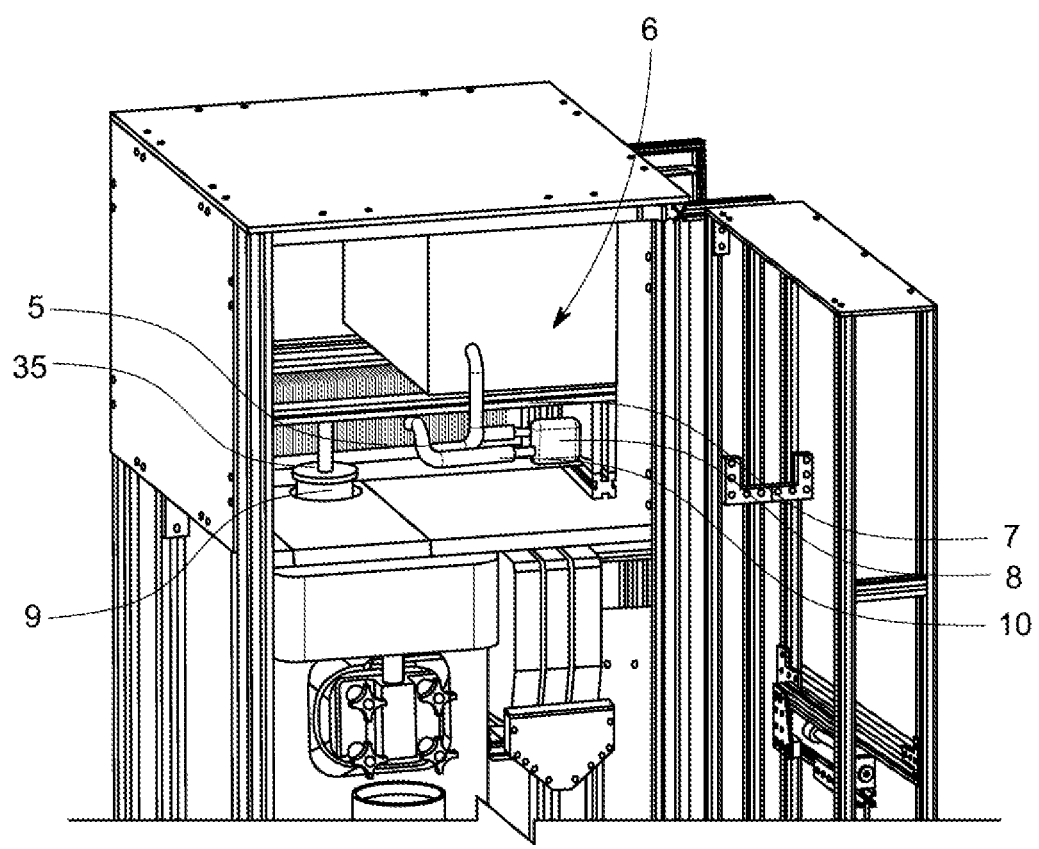
FIG. 2 provides a schematic diagram depicting a partial front view of the automated vending kiosk of FIG. 1.

FIG. 2 further illustrates the upper insulated cavity (2) of the frame (1), which provides strengthening and rigidity to the upper refrigeration unit which may for example be carrying heavy Bag-N-Box products (6) of upwards of 15 gallons. The upper insulated cavity (2) may have inner shelves (7), in varied configurations and sizes, for example, to hold milk-based Bag-N-Box products (6) such as ice cream, frozen yogurt, and frozen drink bases. In addition, the upper insulated cavity (2) may hold other Bag-N-Box products such as liquid Colombian coffee, flavored liquid creamers, and fresh milk.

The upper insulated cavity (2) of FIG. 2 hosts peristaltic pumps (8) which transfer the milk-based liquids directly into the ice cream machine (75) or frozen drink machine (26) through an air mixing stainless steel cup (9). All such pumps are well refrigerated and enclosed by the upper insulated cavity (2). All hoses preferably utilize quick connect fittings, The upper cavity (2) is preferably refrigerated at 4° C., and the close proximity of pumps and tubes (10) to the ice cream/frozen drink base and ice cream dispenser or frozen drink dispenser substantially eliminate the possibility of bacteria build up and thereby reduce the need for frequent sanitation and cleaning as normally found in the prior art.

FIG. 3 provides s a perspective view of the frame (1) with an ice cream dispenser (75) enclosed under the refrigerated cavity (3). The middle section of the frame has a lower shelf (11) which acts as the base for the ice cream maker or frozen drink machine. Along-side the ice cream maker or frozen drink maker is a modular toppings dispenser assembly (12) for providing three types of toppings to the ice cream as served.

In a left corner under a dispensing piston of the ice cream dispenser (75) is a motorized funnel mechanism comprised of an encoder motor and an arm (13). The funnel is drained through a peristaltic pump (14). Upon initiating an ice cream dispensing operation, the funnel mechanism is automatically removed to the side of the frame (1). After the dispensing operation (vending cycle) has completed, the funnel mechanism returns to its home position under the piston.

The funnel mechanism enables, for example, hot water claning of the dispensing piston at after every vending cycle. Hot water is directed through the funnel (17) via a large flexible hose (18) and then gets pumped with a high-speed peristaltic pump (14) to an enclosed Bag-N-Box waste bag positioned for example in the back of the machine.

A main controller of the machine monitors the number of cleaning cycles, and alarms the operator through a dedicated server when the waste bag is nearly full and requires replacement.

Figure 11A:
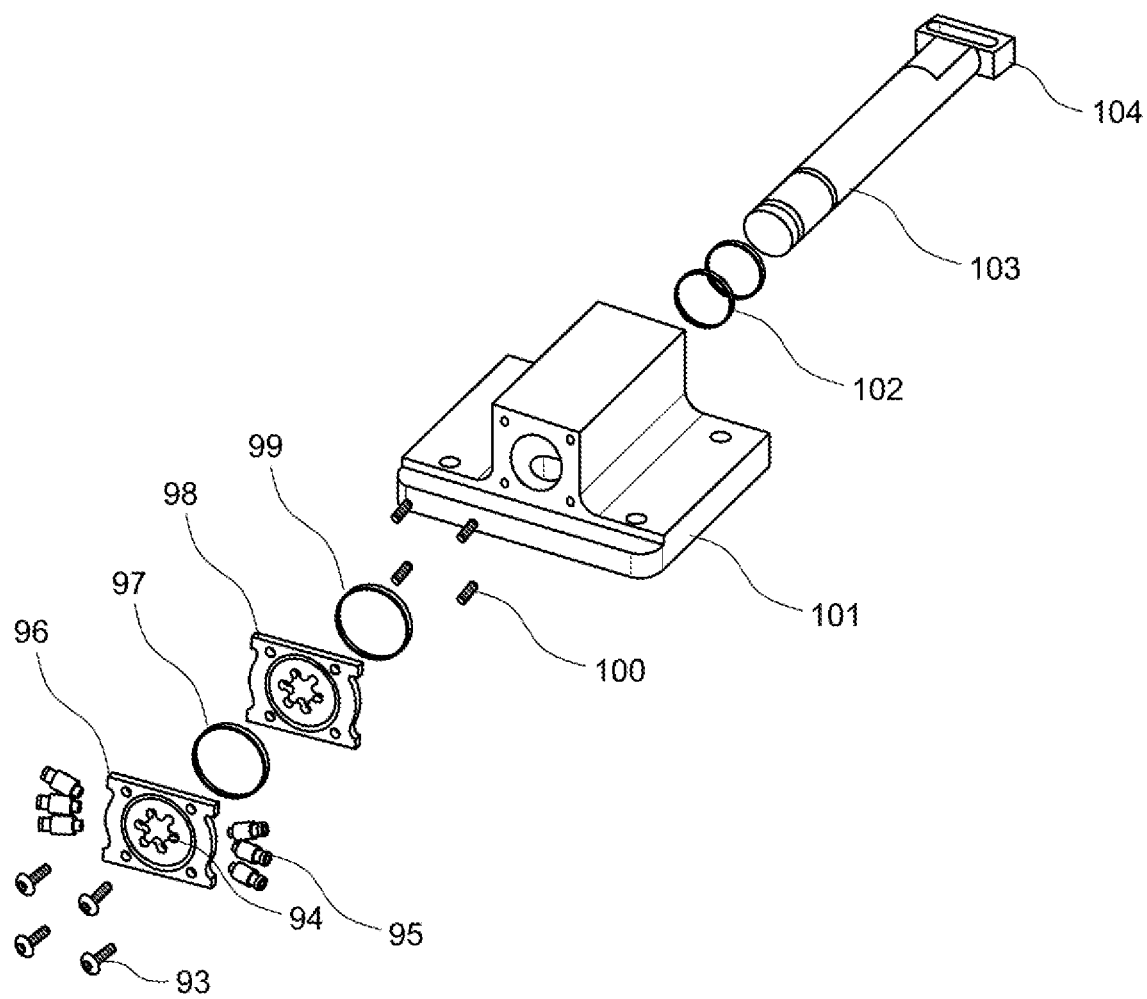
FIG. 11-A illustrates an ice cream dispensing block and flavoring plate for an automated vending kiosk in accordance with aspects of the present disclosure.
Figure 11B:
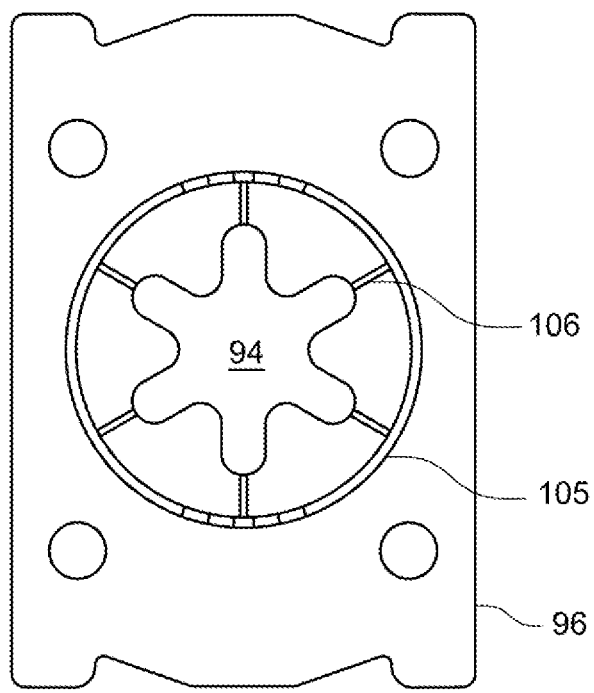
Figure 11C:
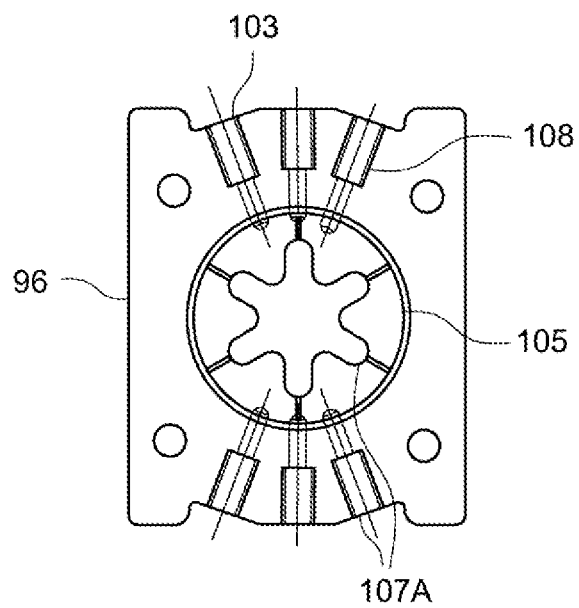

Prior art soft serve machines have an issue with remnants of some soft serve ice cream remaining at the tip of the piston dispensing area after each serving. The remnants normally melt and drips down onto a drip tray, and results in attracting flies and producing a waste buildup that requires ongoing human intervention and cleaning. The system described by the present disclosure utilizes hot water preferably at a temperature of 160° F. to clean the piston area and removes all waste material to the hermetically-sealed Bag-N-Box waste depository. Due to the high water temperature and pressure build up at a flavor dispensing plate see (107) as depicted in FIG. 11-C where the cleaning occurs, there is typically no need for more than 1-2 oz. of cleansing water to completely clean the area from both soft serve remnants and any flavoring remnants. As a result, the next customer in line is guaranteed a fresh and totally clean soft serve portion. Stainless steel funnel (17) and the hose (18) completely heat generated by the hot water so that by the time the water gets pumped to the hermetically-sealed waste bag, the water temperature has dropped substantially and there is little to no pressure build up.

For a system also including a frozen drink machine (26), a second hot water solenoid may be provided to channel hot water from the hot water reservoir straight to the frozen drink delivery station, alongside a dispensing piston of the frozen drink delivery station.

Optionally, liquid Colombian coffee stationed in the upper refrigeration cavity (2) may be dispensed simultaneously with the hot water. Live milk or liquid creamers stationed in the upper cavity may also be dispensed.

FIG. 4-A illustrates a frozen drink machine (26) installed in the frame (1). An actuator (19) is utilized to open and close a piston of the frozen drink machine via plunger actuator swivel device (20), which in turn sandwiches standard operating lever (24) of the frozen drink machine (26). In this manner, plunger actuator swivel device (M) converts the frozen drink machine (26) for operation as an automatic machine without changing any of its original parts. Three push-to-connect valves (25) as depicted connect to hoses that come from the a flavoring box (27) further depicted in FIG. 5, for flavoring frozen drinks with selected mixtures.

FIG. 4-B further illustrates the frozen drink machine (26). Actuator (19) is connected with a quick-release pin (21) to the plunger actuator swivel device (20), which in turn is attached to lever (24) of the frozen drink machine (26). Three threaded push-to-connect valves (25) are located on the frozen drink piston for additionally mixing flavors in the beverage.

FIG. 4-C further illustrates the plunger actuator swivel device assembly (20) and its quick release pin (21) for the purpose of releasing the actuator end from the dispensing block for cleaning and removal of internal mixing parts. The device (20) has a cavity (22) with a diameter slightly larger than the lever handle (24) of the frozen drink machine for unrestricted movement. The device (20) includes two parts (22A, 22B) which sandwich the lever handle (24) and accept the release pin (21). Two Screws (23) mate with two threaded Helicoils (23A) which are imbedded in device body (22A). FIG. 4-D further illustrates the plunger actuator swivel device (20) and its components. FIG. 4-E the plunger actuator swivel device (20) as positioned on the lever (24) in the frame (1). FIG. 4-F provides a perspective view similar to that of FIG. 3, with the frozen drink machine (26) installed in the frame (1) rather than the ice cream machine (75).

FIGS. 4-G and 4-H depict interior components of an automated vending kiosk in accordance with aspects of the present disclosure. For purposes of description, the kiosk may also be referred to herein as the SOFTY SHAKE soft serve and milk shake automatic machine.

Components of the exemplary kiosk as depicted in FIGS. 4-G and 4-H can be described as follows. Rotating arm (409) is connected to a gear motor (414). Cup holder ring (411) is positioned on rotating base (410) is a rotating base, which rotates the cup while ice cream is dispensed, thus distributing ice cream evenly in the cup. Rotating base (410) also assists in dispensing toppings evenly on top of the ice cream or milk shake as dispensed. 16 Oz. milk shake cup (412) held inside the cup ring (411).

Motor bracket (415) holds motor (414) upright, Circular base (413) connects arm (409) to a shaft of the motor (414). Elevator actuator linear carriage (416) is bolted to bracket (416A) which is connected to stainless steel cover (415).

Angle bracket (417A) holds the linear elevator track (417), which travels up and down the linear carriage (416). Connecting plate (420A) connects the track (417) to horizontal linear track (418), which travels right to left horizontally. Hall-effect sensor (419) is positioned along linear track (418) which marks a specific station. Reinforcement angular plate (420) unites Linear Track (418) with the back plate that it is bolted to.

Cleaning waste vertical linear track (421) travels up and down and carries two cleaning funnels, one of which is shown as funnel (422). Upright bracket (423) unites cleaning funnel (422) with a second mixer cleaning funnel (424), as shown in for example in FIG. 4-I.

With reference to FIGS. 4-H and 4-I, mixing spindle (436) of a milk shake mixer (437) extends through cup top plate (430), three topping dispensers (440) dispense toppings on the dispensed ice cream or milk shakes. 16 oz. milk shake cup ring (450) is situated on a step (451) to make up for the height difference of the 16 oz. cups as compared with the smaller 10 oz. soft-serve ice cream cups. Ice cream cup (454) is dispensed by the smaller cup dispensing ring (452).

Removable waste bin (460) is positioned to collect fallen toppings, kiosk frame (470) is configured, for example, as a t-slotted frame as available from 80/20 Inc. of Columbia City, Ind.

In FIG. 4-I, cleaning funnels (422) and (424) are shown in their cleaning positions where actuator (416) is in its top position. Cleaning funnel (424) has extended walls, which pressure against cup top plate (430) in order to allow substantially no hot water spray to spill out while cleaning the Mixer Spindle and the top plate (430).

With further reference to FIGS. 4-J and 4-K, threaded quick-connect 433 perforates the top plate (430) and allows hot water to directly clean the mixing spindle. Water travels from a 3-way split water manifold (434) through a hose (432). Tension spring (431) allows the top plate (430) to sealably pressure against a milk shake cup or against the cleaning funnel (424).

With reference to FIG. 4-I, upright bracket (423) which aligns the funnel (424) properly against mixing spindle (436). Lower funnel (422) takes in cleaning water of an ice cream piston area and ice cream flavoring plate (480). Flex hoses (425) and (425A) direct the cleaning water from the funnels to a peristaltic pump, which dispenses the dirty water into a waste receptacle (for example, a "Bag-N-Box" container).

Cup arm (409) is situated in a straight position not to interfere with the cleaning cycle. Motor (408) rotates cup rotating base (410). Cup rotating base (410) enables ice-cream to be dispensed in a swirl into either the 16 oz. milk shake cup (453) or 10 oz. ice cream cup (454), stainless steel cover (415A) trims a variety of cables and an infrared sensor. Upon completion of the dispensing cycle, cup arm (409) is positioned outside of a machine delivery door with the finished product.

FIGS. 4-J and 4-K further depict the milk shake mixer as follows. Milk shake mixer (437) is connected to a vertical plate (438). Plate (438) is bolted to the 80/20 Frame with a bracket, Top cup plate (430) is suspended on a linear track and carriage (431B) with angle bracket (431A), and bolted to bracket (431A) to facilitate disassembly for maintenance (for example, such as weekly cleaning). Tension springs (431) provide a down force between the mated top cup plate (430) and milk shake cup (453) for effective sealing.

Three-way water manifold (434) delivers water for cleaning the mixer. Quick-connect threaded inlets (433), (433A) and (433B) respectively allow, for example, for a water hose, milk hose and coffee hose to be secured to the top plate (430). Mixing spindle (436) extends through the top plate (430).

FIGS. 4-L through 4-N depict an alternate embodiment according to aspects of the present disclosure, in which water manifold (434) is mounted near the base of funnel (424) such that water jets/nozzles attached to the water manifold (434) are provided along an interior wall of the funnel (424), and are upwardly directed toward the top plate (430) when the funnel (424) and top plate (430) are engaged with each other in a cleaning position. The water jets/nozzles may for example have a 1/16" exit diameter and provide a high-pressure cleaning effect similar to steam cleaning for very effective results.

Figure 5:
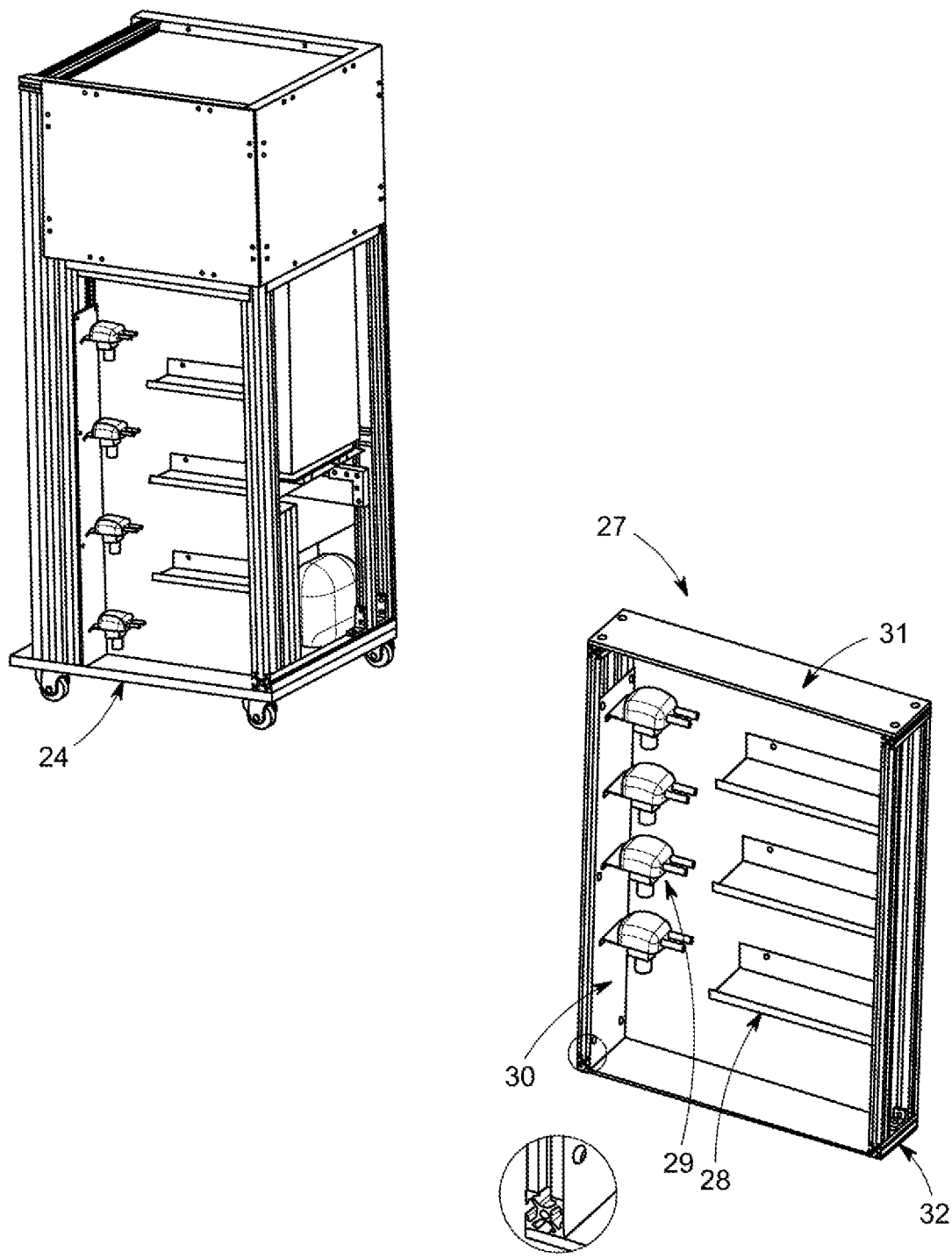
FIG. 5 depicts a removable flavor dispensing unit of an automated vending kiosk in accordance with aspects of the present disclosure.

FIG. 5 illustrates the right side of the frame (1) containing a flavor dispensing cabin (27) with trays (28) and peristaltic pumps (29) which carry Bag-N-Box flavorings. The flavorings get pumped to the flavoring plate (96) as further illustrated in FIG. 11-A or flavoring piston (25) illustrated in FIG. 4-B. Flavoring cabin (27) is preferably removable for the purpose of cleaning, and for the purpose of gaining easy excess to internal components of the ice cream machine (75) or frozen drink machine (26) without having to disassemble components (a frequent problem for prior art systems). The flavoring cabin (27) has an outer shell preferably made of framing material (32), internal skins made of stainless steel (30) and upper and lower closures made of aluminum (31).

Figure 6:
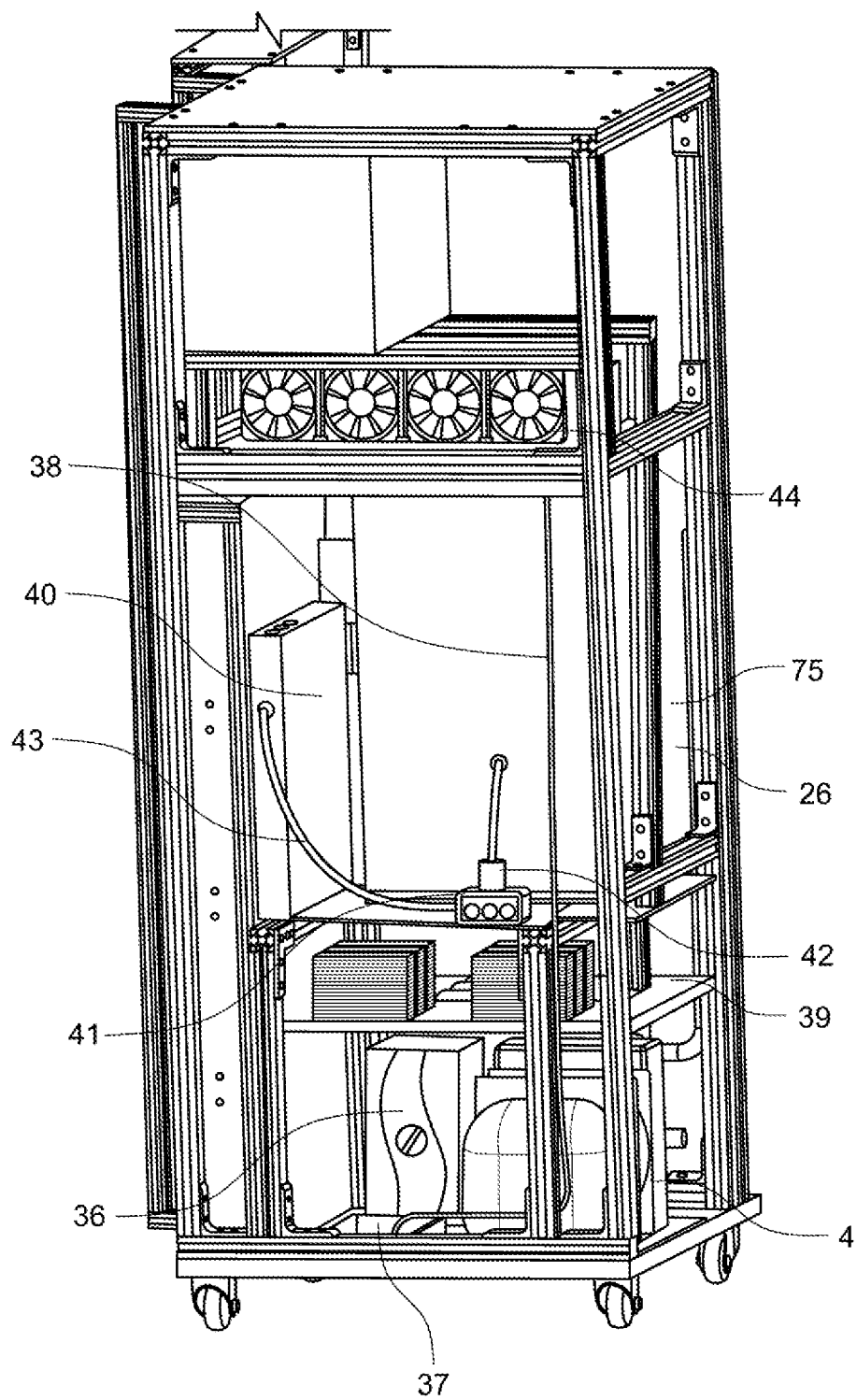
FIG. 6 provides a schematic diagram depicting a rear view of the automated vending kiosk of FIG. 1.
Figure 6A:
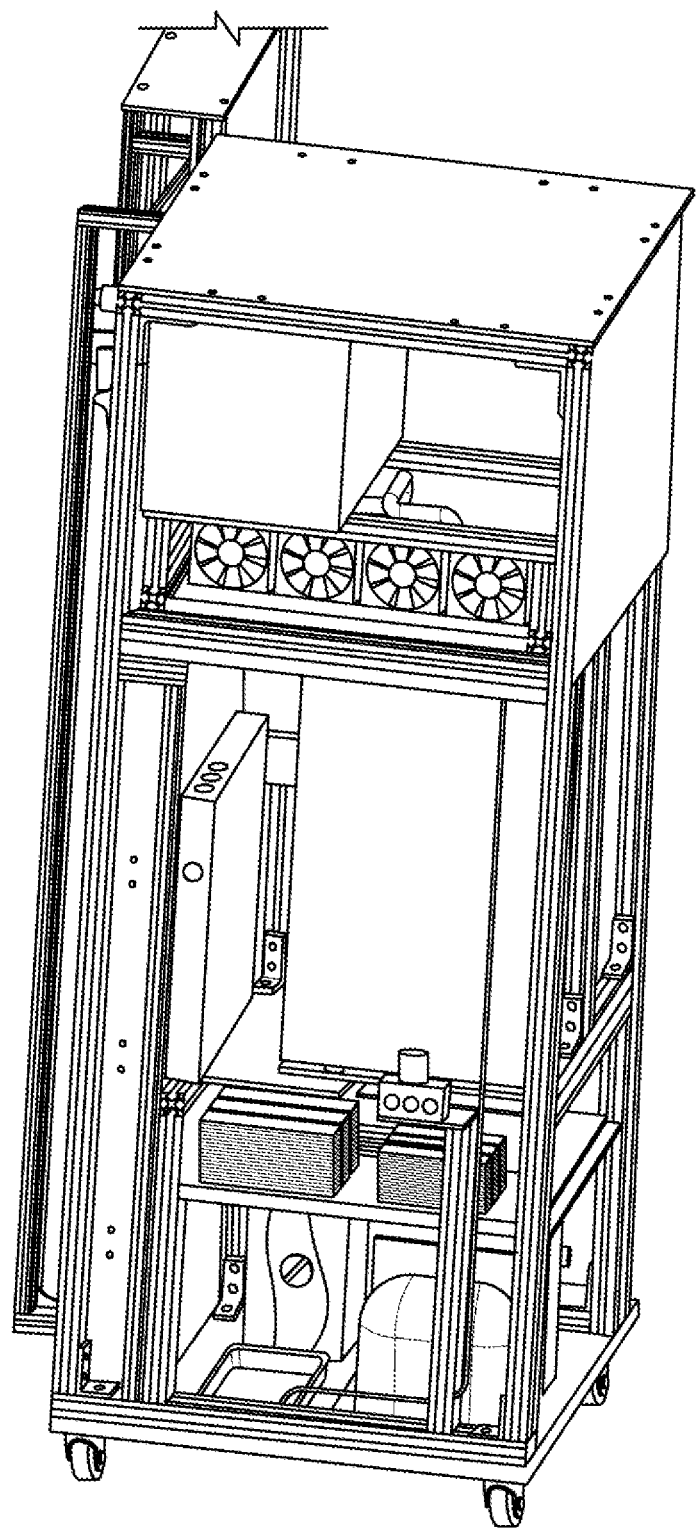

FIG. 6 illustrates the back view of the frame (1), the inner back of the refrigerated compartment having high velocity fans, shelving and the waste Bag-N-Box. Behind the Evaporator there are four high velocity DC fans (44) controlled by a microprocessor. Based on a measured ambient temperature, one or more of the fans will turn on in order to circulate the cooling air more efficiently and aid in chilling the upper unit as fast as possible. The cooling capacity to cubic feet ratio in the refrigerated compartment is preferably 3 to 1.

The Condensing unit (4) is positioned in the lower cavity of the frame (1) next to the hot water reservoir (36) (for example, an INSINKERATOR hot water heater available from Emerson Electric). Behind the reservoir 36 sits a collecting tray (37) which collects condensation dripping through a drip hose (38) from the upper cavity and evaporator tray as shown for example in FIG. 2.

In between a base of the ice cream machine and the lower plate is a removable shelf which carries relay network controllers and power supply (39).

An A/C power supply unit and smart relay system sits in an enclosed box behind the topping dispensing mechanism (40). The ice cream machine (75) or frozen drink machine (26) are plugged in to a junction box (41) which accepts a dispensing unit plug (42) as an ordinary outside machine. Junction box (41) is connected to the smart relay system via a conventional electrical cable (43). If the ice cream machine (75) or frozen drink machine malfunctions and needs an extensive repair, these units can be removed easily aft being unplugged from junction Box (41). FIG. 6-A provides a second back view of the frame (1).

Figure 7A:
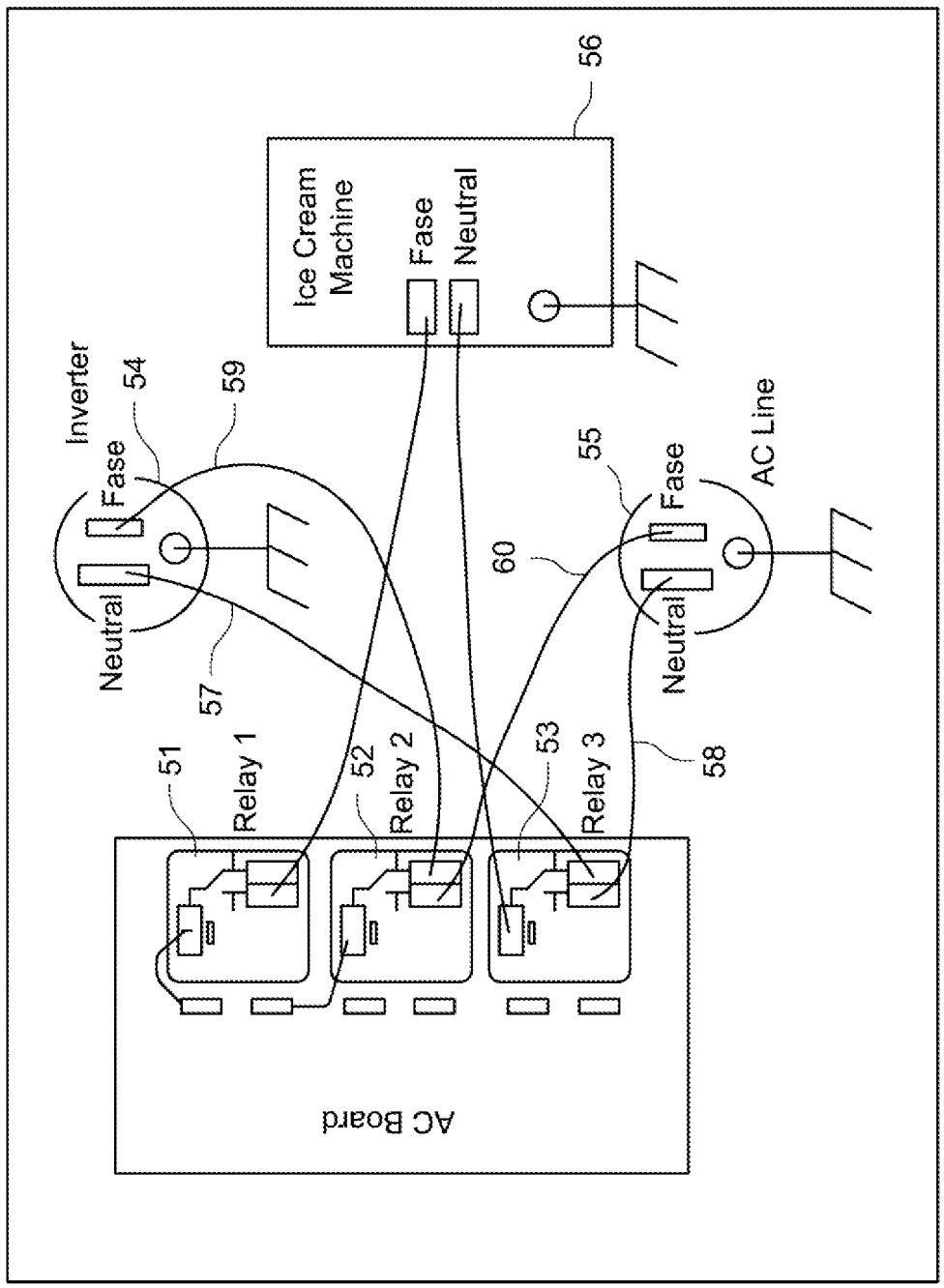
FIG. 7-A provides a schematic diagram depicting elements of a power management sub-system in accordance with aspects of the present disclosure FIG. 7-B provides another schematic diagram depicting elements of the power management sub-system of FIG. 7-A.
Figure 7B:
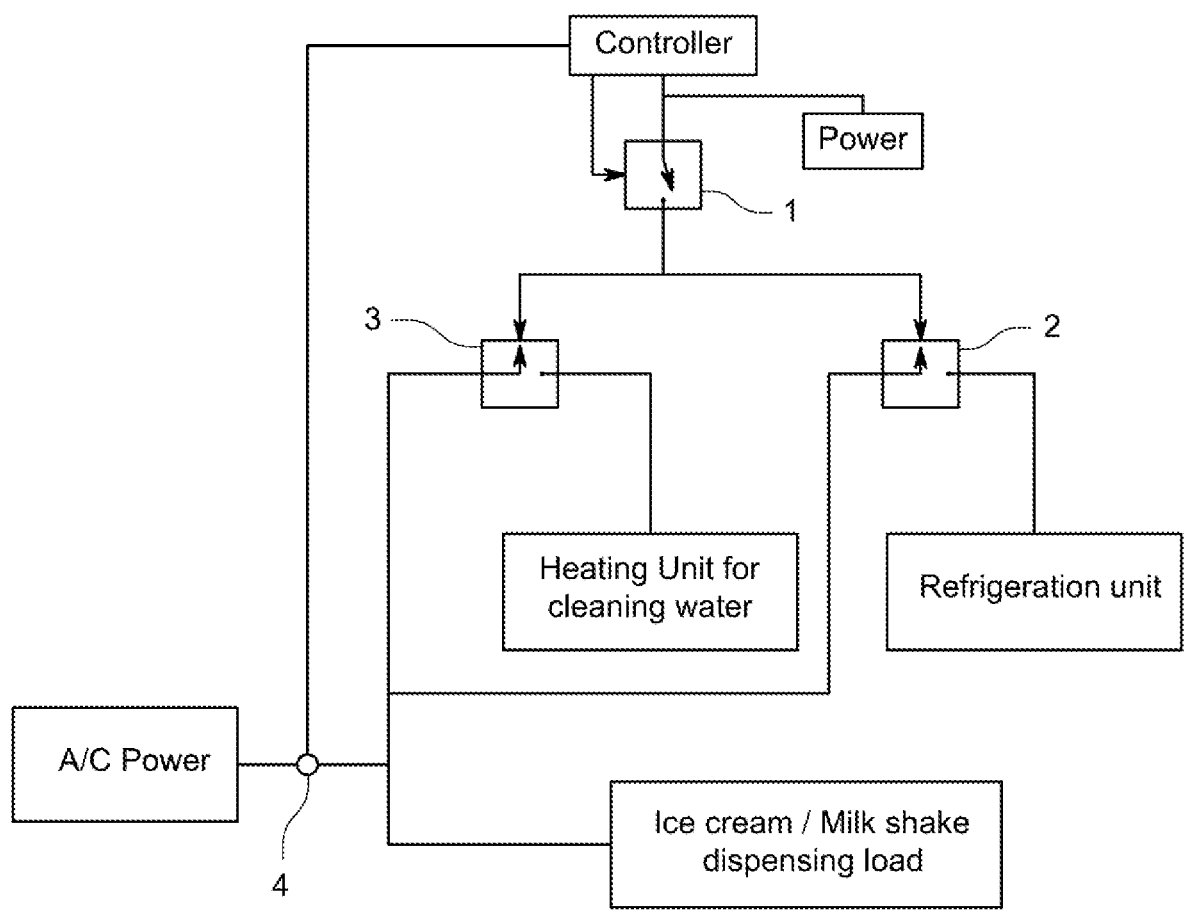

FIG. 7-A provides a schematic diagram of the power management system for the frame (1). Smart relay (51) senses an initial pick demand (cranking power demand) of a large compressor in the ice cream machine (56), for example, through a Hall-effect current sensor. Relay (52) and relay (53) are normally closed and supply the cranking power through a high wattage inverter (54) and a bank of batteries (or, alternatively, a bank of charged high amperage capacitors). Once smart relay (51) determines that the pick demand has dropped to a much lower running amp demand which occurs a few seconds later, it will simultaneously turn both relays (52) and (53) to a normally open position at the rate of 1/1000th of a second and seamlessly supply the ice cream machine with the much lower running amperage from the grid A/C line (55), nominally is rated at 15 Amps. Neutral (57) and Leg (59) coming out of the Inverter (54) or Neutral (58) and Leg (60) coming of the Grid (55) are routed through different relays for additional protection to the system.

FIG. 7-B provides a schematic diagram illustrating additional aspects of the power management system. The automated vending machine is designed and configured to draw 16 amps at start-up, and draw 12 amps while running For example, the refrigeration deck is designed and configured to draw 6 amps. The hot water system used for constantly sanitizing the ice cream machine and milk shake mixer is designed and configured to draw 6 amps. In sum, the above systems are configured to draw 28 amps.

In order to operate the SOFTY SHAKE machine using a 15 amp service, the soft serve ice cream maker is operated as an auxiliary component. The soft serve machine independently refrigerates the soft serve mix in its freezing cylinder, managed by a dedicated ice cream machine controller. Every 5 to 6 minutes, the ice cream maker typically starts by drawing 16 to 18 amps for a few seconds, and then moves down at a running operation to draw 12 to 13 amps.

The ice cream maker is pluggable into the SOFTY SHAKE machine via a "smart plug" and a secondary harness which links the machine computer to the ice cream maker controller via an RS 485 link.

With reference to FIG. 7-B, a series of relays are controlled by the SOFTY SHAKE machine computer to manage power allocations among the components of the machine. Relay 1 (a master relay) is normally closed to provide the Ice Cream machine with power. The relay 1 and machine computer operate to constantly evaluate power draw, for example, by means of a hall-effect amperage sensor. Relay 1 has four configured parameters which may be manipulated based on the type of ice cream maker provided inside the SOFTY SHAKE machine:

Maximum power consumption: (typically 20 amps). A draw above this level will result in shutting down the Ice Cream machine and an error report will be wirelessly transmitted.

Minimum power consumption: (typically set at 0 amps, because when the machine is idle there is a minimal power draw).

Operating power consumption: This is the most important one. When the amperage sensor at relay 1 (Master) detects this predetermined amperage level, the system computer and/or master relay 1 will shut down slaves relays controlled by the master relay 1 to allow the ice cream maker to operate at maximum power off the grid for a few seconds until operating conditions for the maker are achieved.

Operation current hysteresis: This parameter represents the difference between a kick start amperage and running amperage at a lowest level consumption. For example, if the kick start amperage is 16 amps and running levels are 12 to 10 amps, than hysteresis will be 5 amps. Under this condition, when the draw at master relay 1 drops below 12 amps the system computer may activate one or more of the slaves relays once again.

As depicted in FIG. 7-B, relay 2 is a slave relay managing the refrigeration unit or deck, which is normally open (not transmitting current) and is preferably managed independently by a SOFTY SHAKE thermostat. Relay 2 is also controlled by the Master Relay 1 independently of the thermostat. For example, the thermostat may signal to activate the slave relay for refrigeration, but be prevented from doing so by master relay 1 if the ice cream machine is in the initial kick start mode drawing 16 amps. However, when the hysteresis level is reached at a stable running amperage draw, the Thermostat once again takes control.

Relay 3 as depicted in FIG. 7-B is a slave relay managing an independent hot water system component (for example, an INSINKERATOR hot water heater available from Emerson Electric). The unit is capable of maintaining water temperature without power for a long period of time, as managed through its own dedicated thermostat. A current sensor 4 is positioned to sense an overall current draw for the SOFTY SHAKE, machine, and to provide this to the machine computer to guide the above-described operation of relay 1.

The master relay 1 and/or machine computer is preferably equipped with a watchdog program that monitors for anomalous operating conditions. For example, anytime the ice cream machine as activated initially by the SOFTY SHAKE computer (for instance, upon moving from idle to ice cream production), an initial machine production command is sent through the RS 485 Harness to start the watchdog program to monitor certain parameters. For example, if the ice cream machine fails to kick start due to a momentary low voltage in the area, the watchdog program will immediately report such incident to a main controller (VMC Controller) of the system computer, and the initial machine production command will be sent once more automatically without human intervention.

By way of a second example, the watchdog program may also determine if the ice cream machine is trying to chill the freezing cylinder for a duration much longer than is normally necessary, and in this event will shut down the ice cream machine operation and report it. Because an over-freezing malfunction may result any one of freezing and burning out the refrigeration compressor, or freezing and creating a blockage in the ice cream mixing cylinder or aerator, preventing over-freezing helps to guarantee smooth operation of the system.

Figure 8:
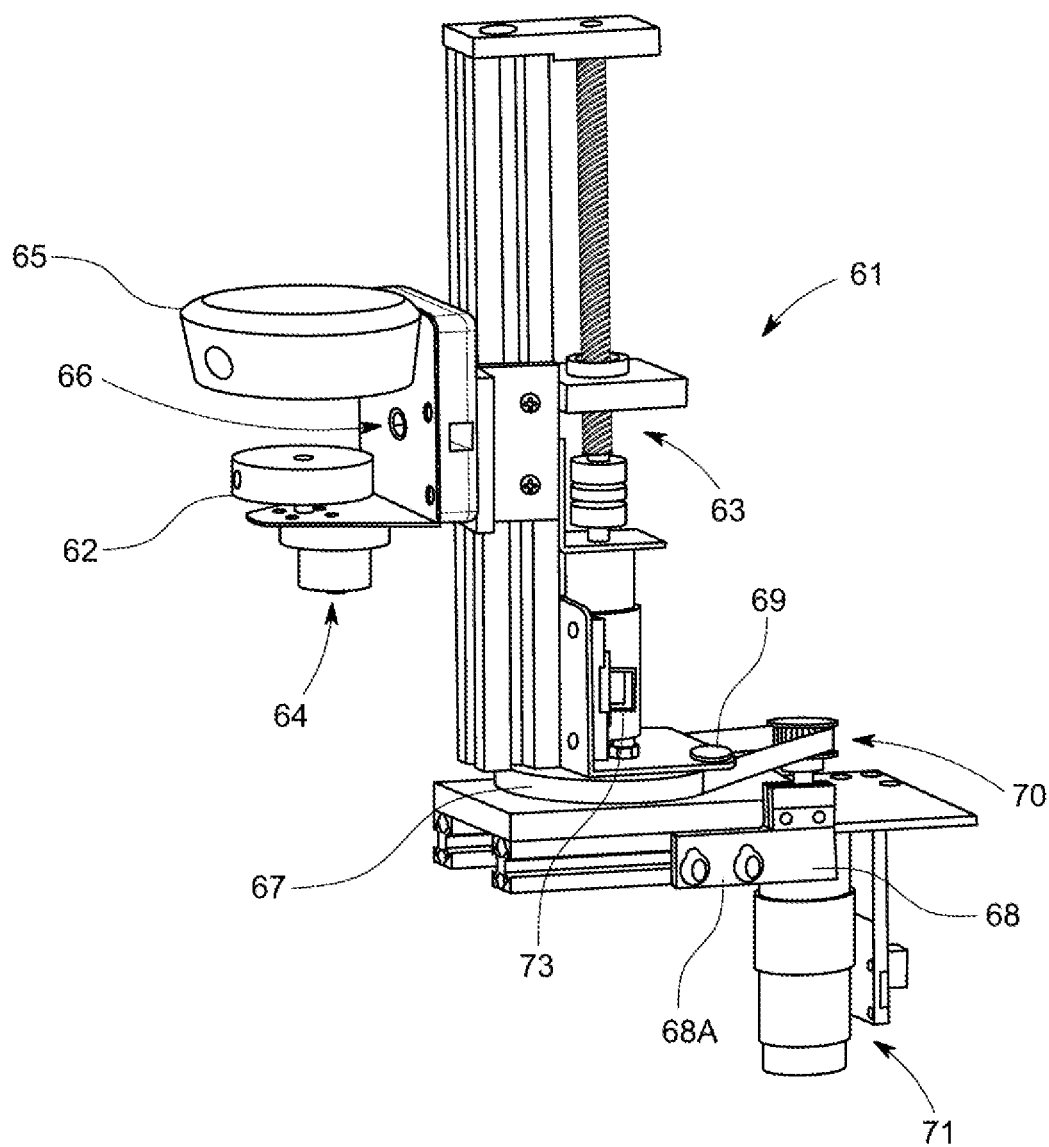
FIG. 8 depicts an X-Y-Z cup transport system for an automated vending kiosk in accordance with aspects of the present disclosure.

FIG. 8 illustrates an X-Y-Z cup transport system (61) in accordance with principles of the present disclosure, configured to be positioned on a modular door of the frame (1). Cup ring (65) positions a cup straight over a rotating base (62), which delivers ice cream to the cup in a swirl while minimizing the footprint of the transport system (61). In order to fill an entire cup with ice cream, the system uses up and down elevator mechanics (63) and a constantly rotating base (62) upon which the cup sits. The up and down movement (63) and constantly rotating base (62) are preferably connected to a 30 RPM Motor (64) that function to fill up the cup with the dispensed ice cream in a swirl shape comparable to a hand delivered ice cream in the ice cream parlor, and without using expensive multi-movement robotic arms as in the prior art which may cost thousands of dollars and take up to four times more space in the machine. An infrared sensor (66) reports to the main controller that there is a cup properly positioned in the cup ring (65). The entire cup arm swivels, and is situated on top of a large sprocket (67) which is driven by a smaller sprocket (70) that is connected to the shaft of an encoder motor (71). A home position is determined using a magnet ring (69) and a Hall-effect magnet reader (68), which is connected to a variable position bracket (68-A). Once the filled-up cup is removed by the customer, the infrared sensor (66) lets the main controller know that the cycle can be closed. A UTP adapter mini-hoard (73) acts as a bridge between the motor (71) with encoder and its control cables and the board (73), where conventional UTP cables transfer the proper data and energy to the motor without the need of expensive harnesses.

One of the hallmarks of the SOFTY SHAKE machine is that it functions to fill up an ice cream cup with soft serve proportionally without using a cumbersome robotic arm. As ice cream is poured into the cup the swivel base (in which turns the cup constantly on its axis) it is evenly distributed within the cup. The same result also holds true for the distribution of toppings. Absent the swivel base, dispensed ice cream dispensed would instead hit the center of the cup and pile up.

Figure 9:
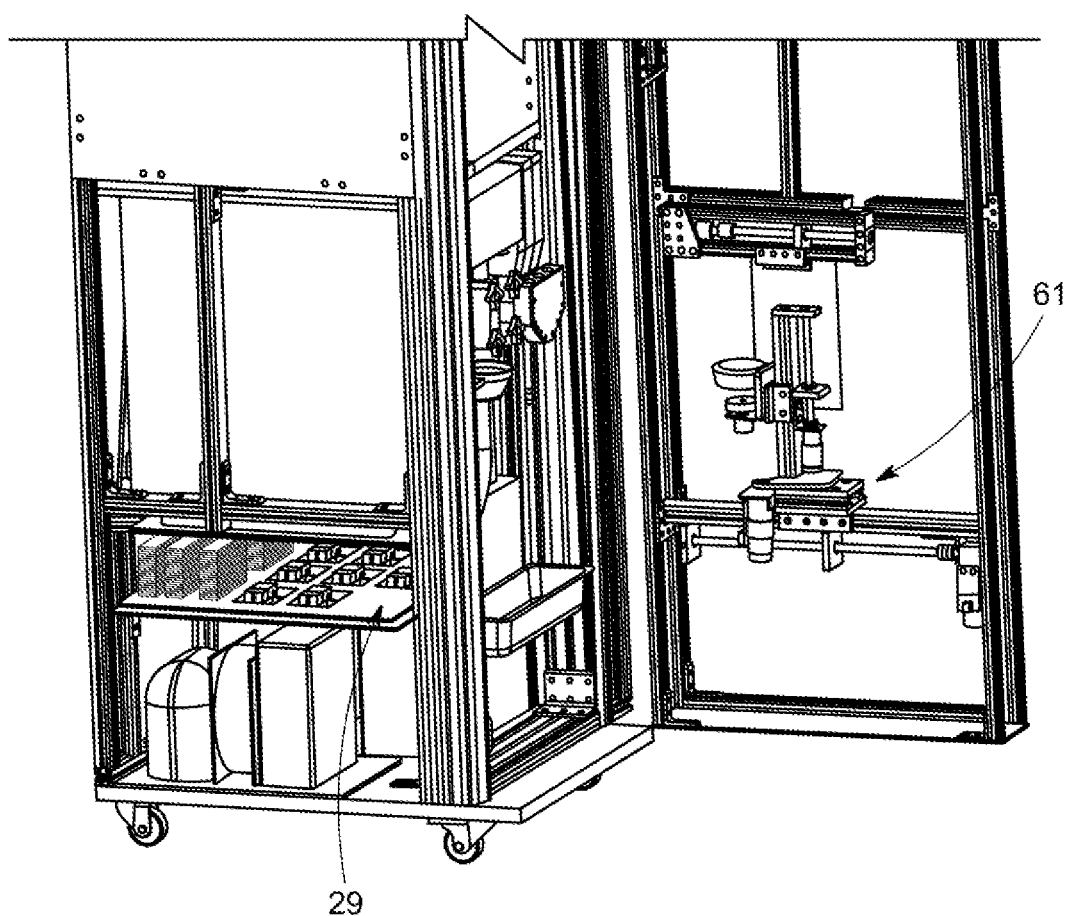
FIG. 9 illustrated the X-Y-Z cup transport system as positioned on a front door component of the automated vending kiosk in accordance with aspects of the present disclosure.
Figure 10A:
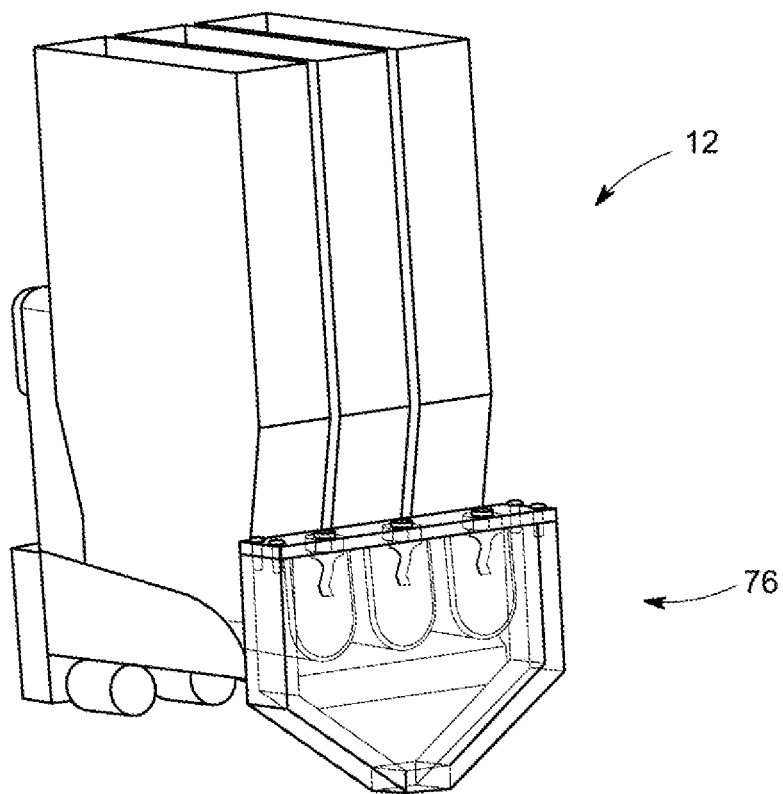
FIG. 10-A illustrates a topping dispenser system of an automated vending kiosk in accordance with aspects of the present disclosure.
Figure 10B:
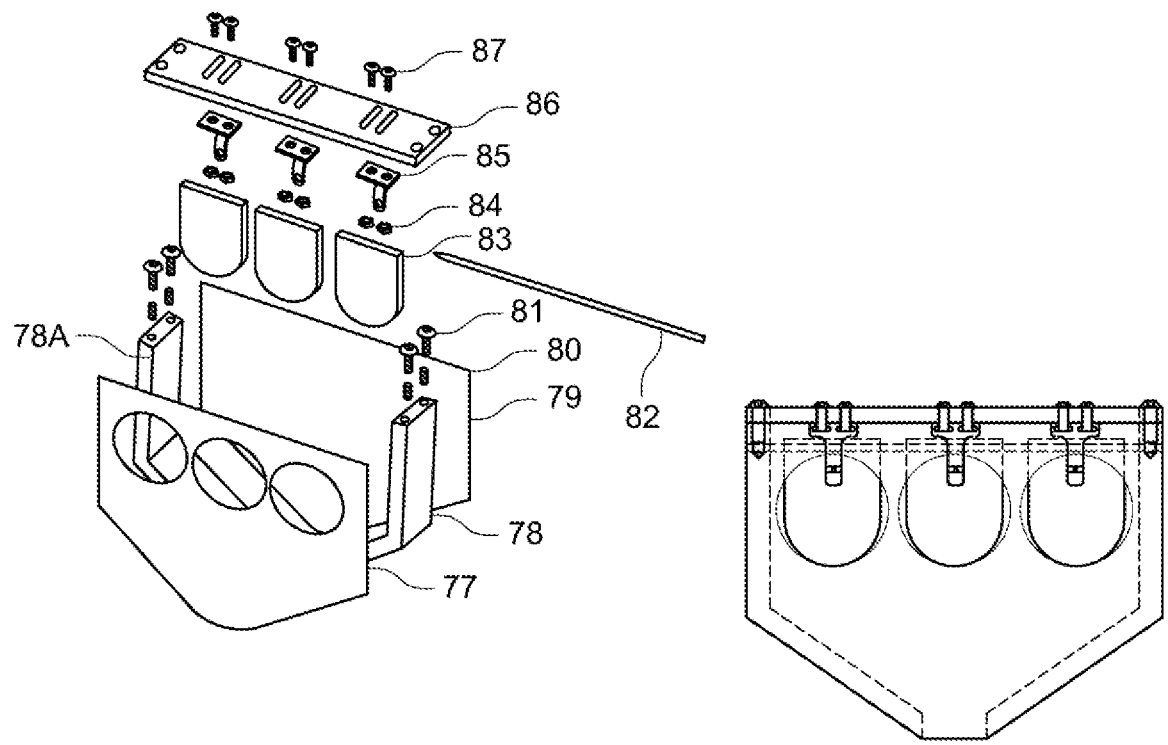
Figure 10C:
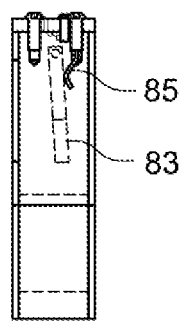
Figure 10D:
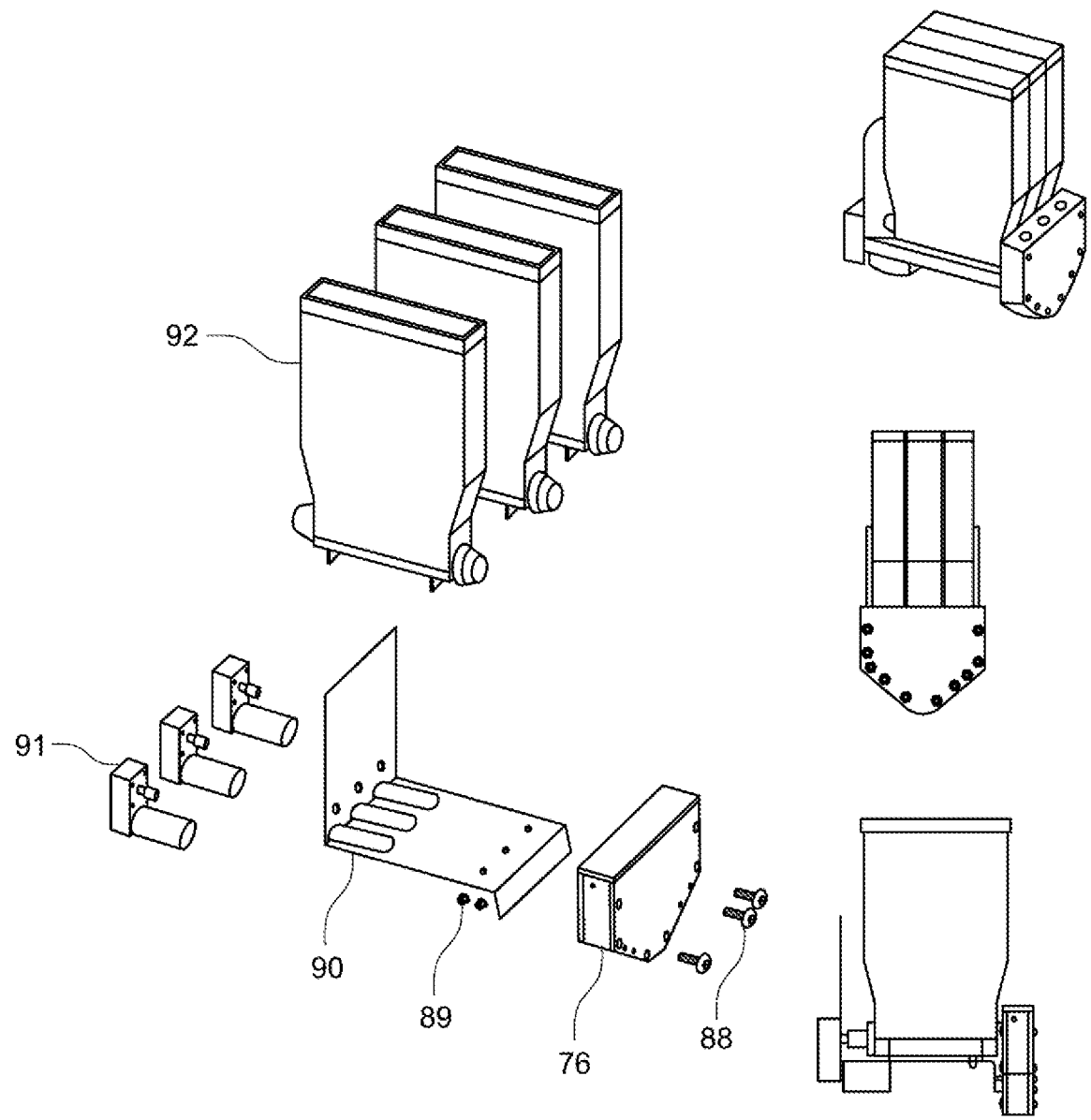

FIG. 9 illustrates the invention X-Y-Z cup transport system (61) as it is positioned within the modular door of the frame (1). When the door is opened, the XYZ cup transport system (61) remains out of the way essentially within the door, which allows an operator to clean the Ice Cream or Frozen Drink dispensing area with ease. FIG. 9 also illustrates the AC/DC module and relay control network, positioned on a removable shelf (29) underneath a main shelf of the ice cream dispenser (75) or frozen drink machine (26).

FIG. 10-A illustrates a modular toppings/granular dispenser (12) and funnel assembly (76) according to aspects of the present disclosure, which dispenses toppings for the ice cream product in the SOFTY SERVE machine. The funnel assembly (76) is designed to prevent any spillage of toppings from the dispensing canisters while the dispenser (12) is removed for filling, or while the machine is shaken by an angry customer.

The funnel assembly (76) is attached to the toppings canisters augers (91), as shown in FIG. 10-D. The purpose of the assembly (76) is to prevent the toppings from becoming stale by preventing humidity from entering the canisters, as well as preventing the toppings from falling out of the auger due to machine vibration (for example, while mixing a milk shake) and maintaining the toppings in the canisters to prevent unwanted spillage.

FIG. 10-B illustrates components of the funnel assembly (76). Flaps (83) is a flap are used to secure openings of the topping canisters (92) of FIG. 10-D. Spring latches (85) push flaps 83 against the toppings canister openings to create a hermetic closure. When activated, the force of the auger pushing the toppings forward will press the toppings against spring latches (85), causing flaps (83) to allow the necessary quantity of toppings to exit the flaps (83). Once the augers are halted, the rest of the toppings are sealably retained in the canisters as the flaps (83) are re-seated.

As further illustrated by FIG. 10-B, securing screws (87) secure spring latches (85) to a funnel upper body (86). Securing screws (84) secure the spring latches (85) to the flaps (83). Axis rod (82) retains the flaps (83) in a matter that enable a rotational forward movement of the flaps (83) in response to the material force generated by toppings moved by the augers (91). The funnel assembly (76) includes a funnel face wall (77), a funnel structure (78) and a funnel back wall (79), with perforations in the funnel upper body (86) to match the openings of the toppings canisters. Securing screws (81) which attach the funnel upper body (86) to the funnel body (78).

FIG. 10-C provides a side view of the funnel assembly (76) while in a closed position, thus not allowing any granular material from falling out of the Dispensing Canisters. As illustrated, spring latches/clips (85) place pressure against movable flaps (83) which block the passage from the dispensing canisters spouts; thus securing any granular content from falling off the canisters. FIG. 10-D further illustrates the components of funnel assembly (76).

FIG. 11-A illustrates ice cream dispensing block (101) and flavoring plate (96) and associated components in accordance with aspects of the present disclosure. Flavoring plate (96) includes upper unit (98) and lower unit (196). As illustrated, flavoring plate (96) has six threaded inlets designed to receive six push-to-connect tube fittings (95). One of skill in the art will readily recognize that many other configurations of inlets and fittings are possible and within the scope of the present disclosure.

In the middle of flavoring plate (96) there is a star design orifice (94) for shaping the soft serve ice cream flowing through it, and at the same time, flavoring the outer layer of the soft serve with flavoring syrups that are pumped through the push to connect fittings (95).

Lower plate (96) fits with upper plate (98), with a rubber gasket (97) in-between for a tight seal of the flavoring channels. A rubber gasket (99) is positioned on top of the upper plate (98) for a tight seal between the flavoring plates (96, 98) and the dispensing block (101). Four knurled-head thumb screws (93) preferably secure the two flavoring plates together and onto the ice cream dispensing block. Four threaded helicoils (100) preferably are tightly pressed and glued to the lower portion of ice cream block (101) in order to receive the knurled thumb screws (93) in a tight fit.

Mechanical piston (103) can be pushed in and out by a motorized function to dispense the ice cream. Two gaskets (102) are situated in the lower portion of the mechanical piston (103) for improved sealing, and the upper portion of the piston (104) is designed to be inserted into a mechanical lever connected to a motor.

FIG. 11-B provides an upper view of the flavoring plate (96). A circular channel (105) gets filled with the flavoring syrup, and through hydraulics will fill in each one of the grooves (106) which in turn flavor each one of the tips of the shaping star (94) and thus flavor the outer layer of the soft serve which flows through.

FIG. 11-C presents a phantom upper view of the flavoring plate 6), in which opposing sides of the plate each have three perforations (108) which reach the flavoring channel (105) with a threaded end (107) for the receipt of the push-to-connect tube fittings. Since the flavoring circular channel (105) meets all inlets, one of the 6 inlets (107A) can be connected to the hot water dispensing to pressurize the flavoring plate with steaming hot water that cleans the entire flavoring channel (105) and each one of the flavoring grooves (106), as well as clearing any soft serve remnants at the tip of the shaping star (94). This leaves the area totally clean and clear of the previous flavors and soft serve, and substantially eliminates the possibility of bacterial formation.

Figure 12:
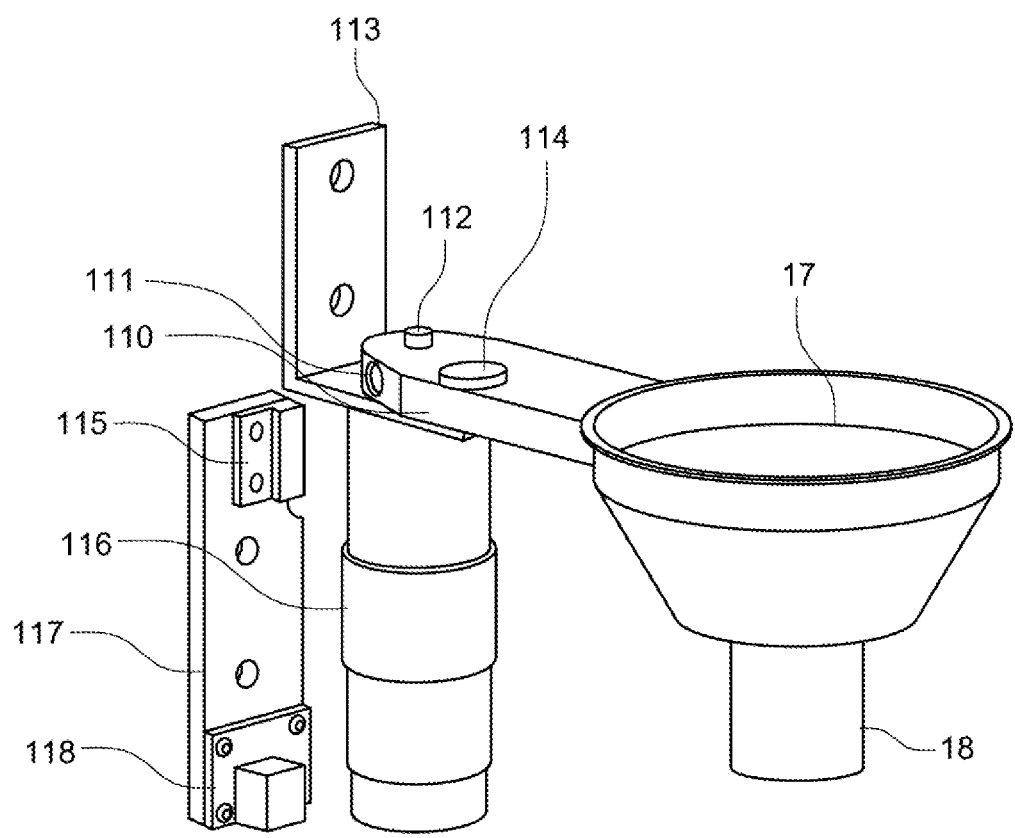
FIG. 12 illustrates a motorized waste collecting funnel for an automated vending kiosk in accordance with aspects of the present disclosure.
Figure 13:
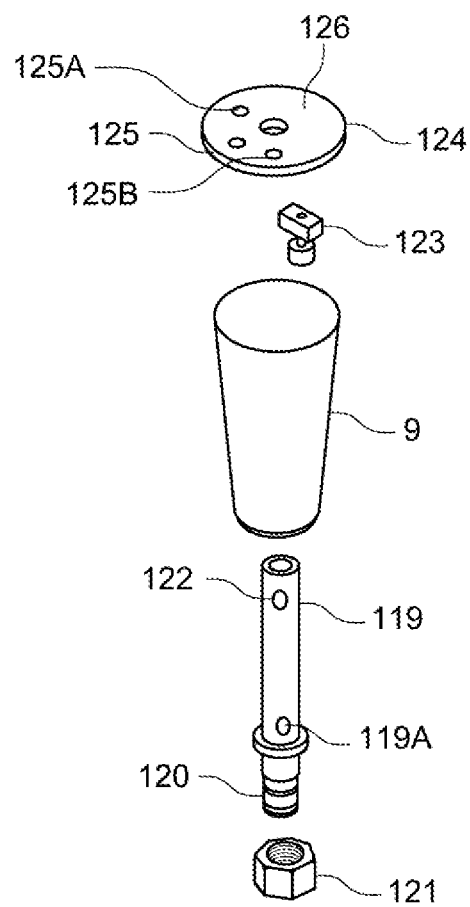
FIGS. 13 and 13-A illustrate a threaded aerator for fitting to a sealed air/mix cup in a gavity-fed oft serve ice cream machine according to aspects of the present disclosure.

FIG. 12 illustrates the motorized waste/drip funnel (17) and its components. FIG. 13 illustrates a removable air/mix cup and its components.

FIG. 13-A illustrates an aerator insert (120) of the air/mix Cup, including two sealing gaskets, which is inserted into a conventional soft serve/frozen drink machine hopper. The insert (120) includes a large threaded portion (127) which enables nut (121) to secure the aerator (122) to the air/Mix cup (9). Flange (128) receives a sealing gasket to secure the insert (120) from the inside of the air/Mix cup where a human hand cannot fit.

Figure 14:
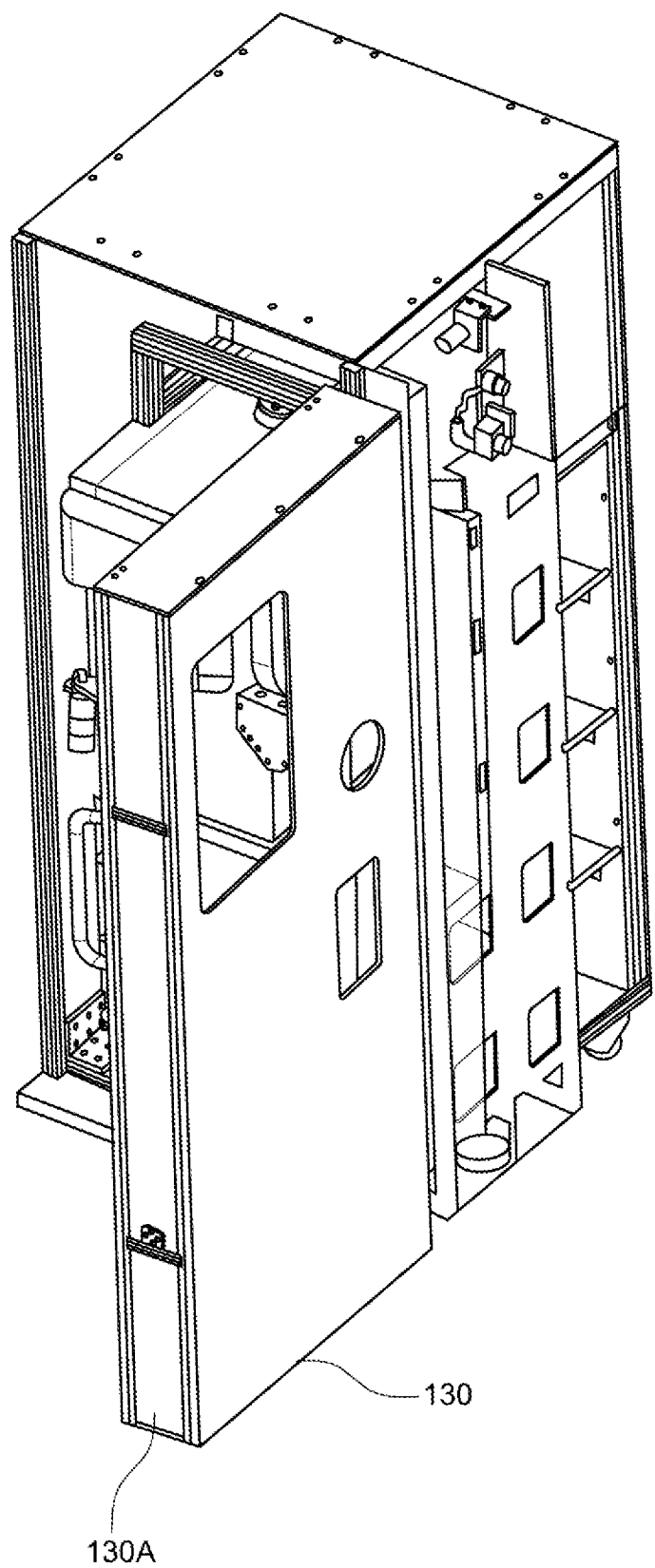
FIG. 14 provides a perspective view of an automated vending kiosk according to aspects of the present disclosure.

FIG. 14 Illustrates the invention modular door wrapped with a printed polycarbonate shell (130), which has openings for a touch screen control panel, delivery door and viewing window. The panel is preferably printed on the inside, and illuminated from the inside through DC power LEDs.

Figure 15:
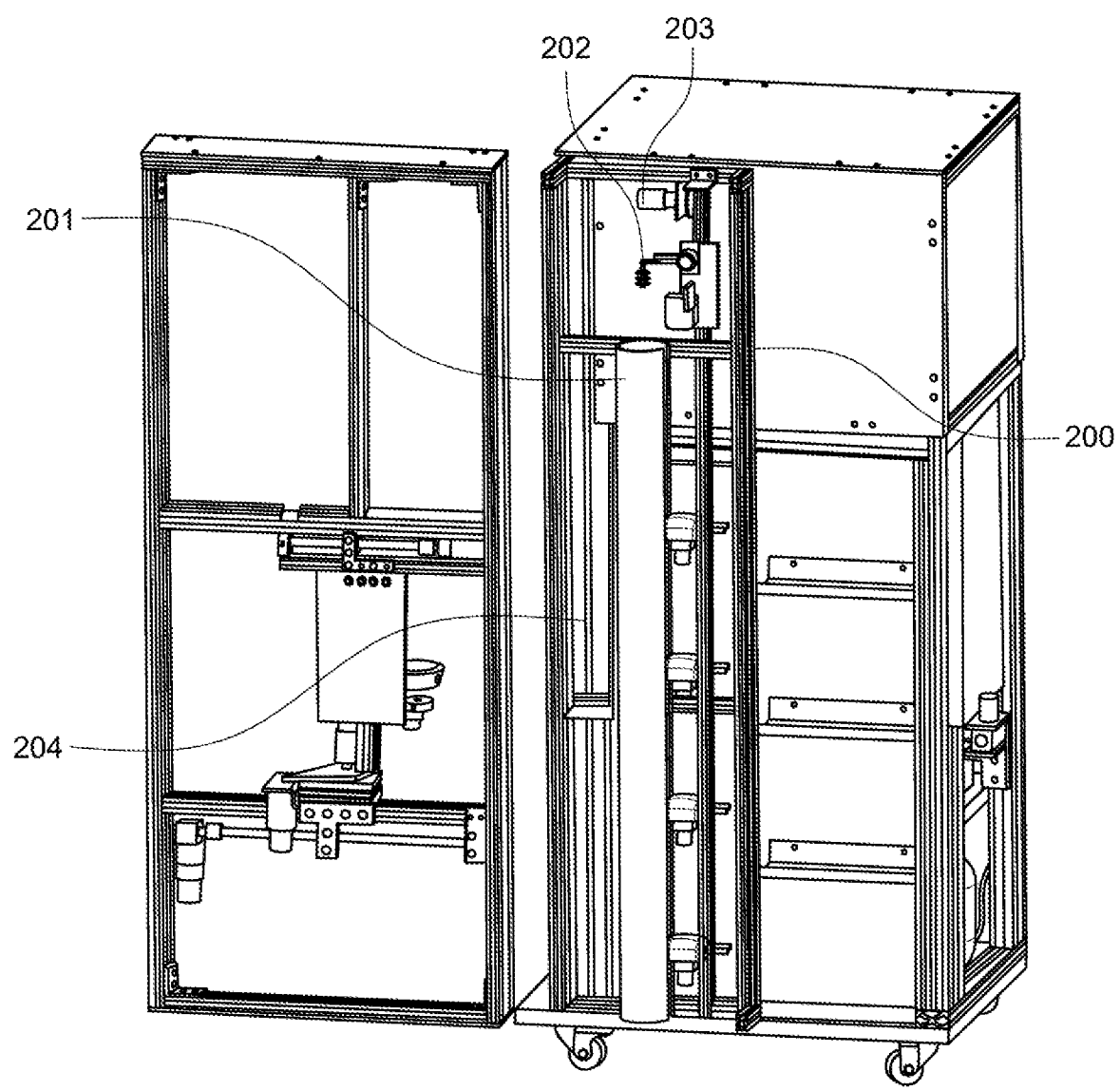
FIG. 15 illustrates a modular robotic cup dispensing unit as fitted to an automated vending kiosk according to aspects of the present disclosure.

FIG. 15 Illustrates the invention 1st embodiment of its modular robotic cup dispensing unit attached to the outer side of the Invention Universal Refrigerated frame.

FIG. 15 is an illustration of a modular cup dispenser in accordance with principles of the present disclosure, which is configured to suction a cup from a vertical stack of cups inside an acrylic tube. The acrylic tube is sliced vertically to allow the suction device and mechanism a vertical entry. Once a cup is suctioned, the elevator holding the suction device will bring it straight upwards through the acrylic tube, then swivel the cup to a slanted upwards position and release the suction; the cup will then fall down, hit the edge of a chute and in most cases flip and fall right into the receiving chamber where the customer picks it up. This Robotic cup retrieval system is attractive and eye catching accompanied by an LED light show will bring more customers towards the machine. Since all cups are stacked in a downward position inside the acrylic tube, this cup retrieval show may be triggered by the timer of the machine's computer but instead of releasing the cup to the chute, the procedure will let go of the cup as it reaches the end of the acrylic tube. The cup will fall again and align itself onto the stack again, due to the air trapped in the tube and gravity. The Cup retrieval show may preferably be triggered by an infrared sensor at the door of the machine (for example, a KINECT motion sensor from MICROSOFT Corporation of Redmond, Wash.) which allows the computer to identify a customer approaching the machine or watching the machine. Based on that decision the computer may trigger the cup dispenser retrieval procedure or other robotic procedures at the machine.

Figure 16:
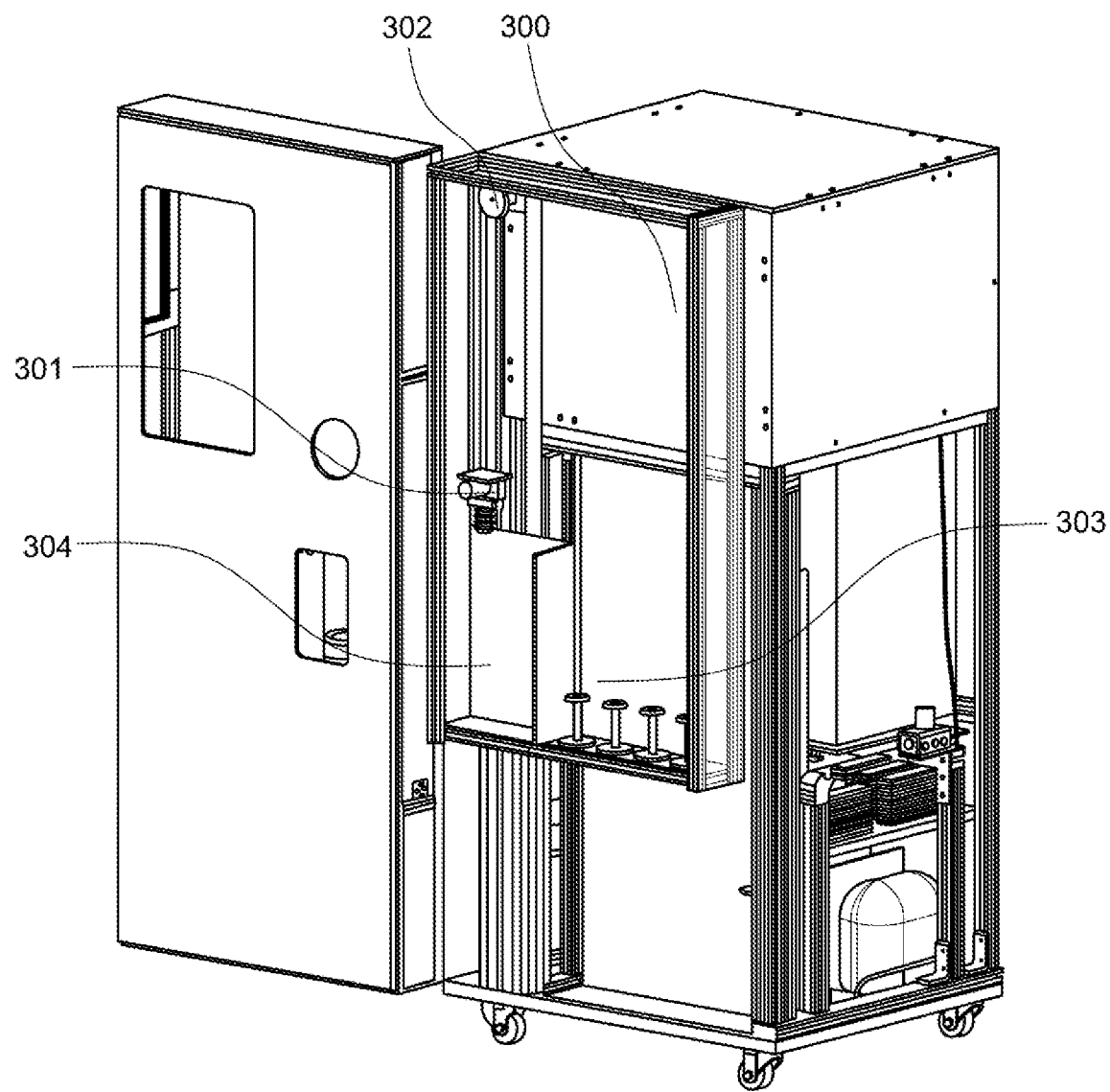
FIG. 16 through 16-F illustrate elements of another modular robotic cup dispensing unit as fitted to an automated vending kiosk according to aspects of the present disclosure.
Figure 16A:
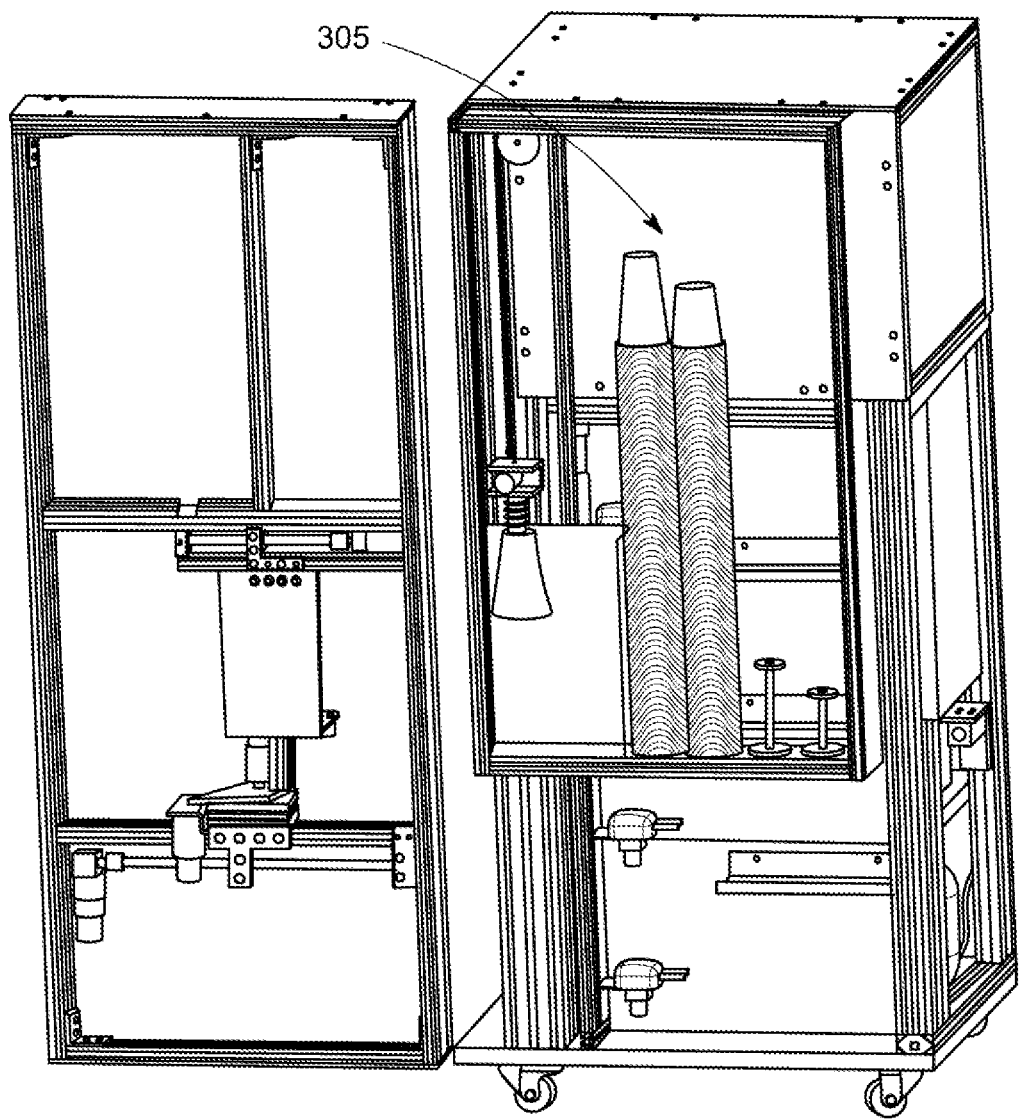
Figure 16B:
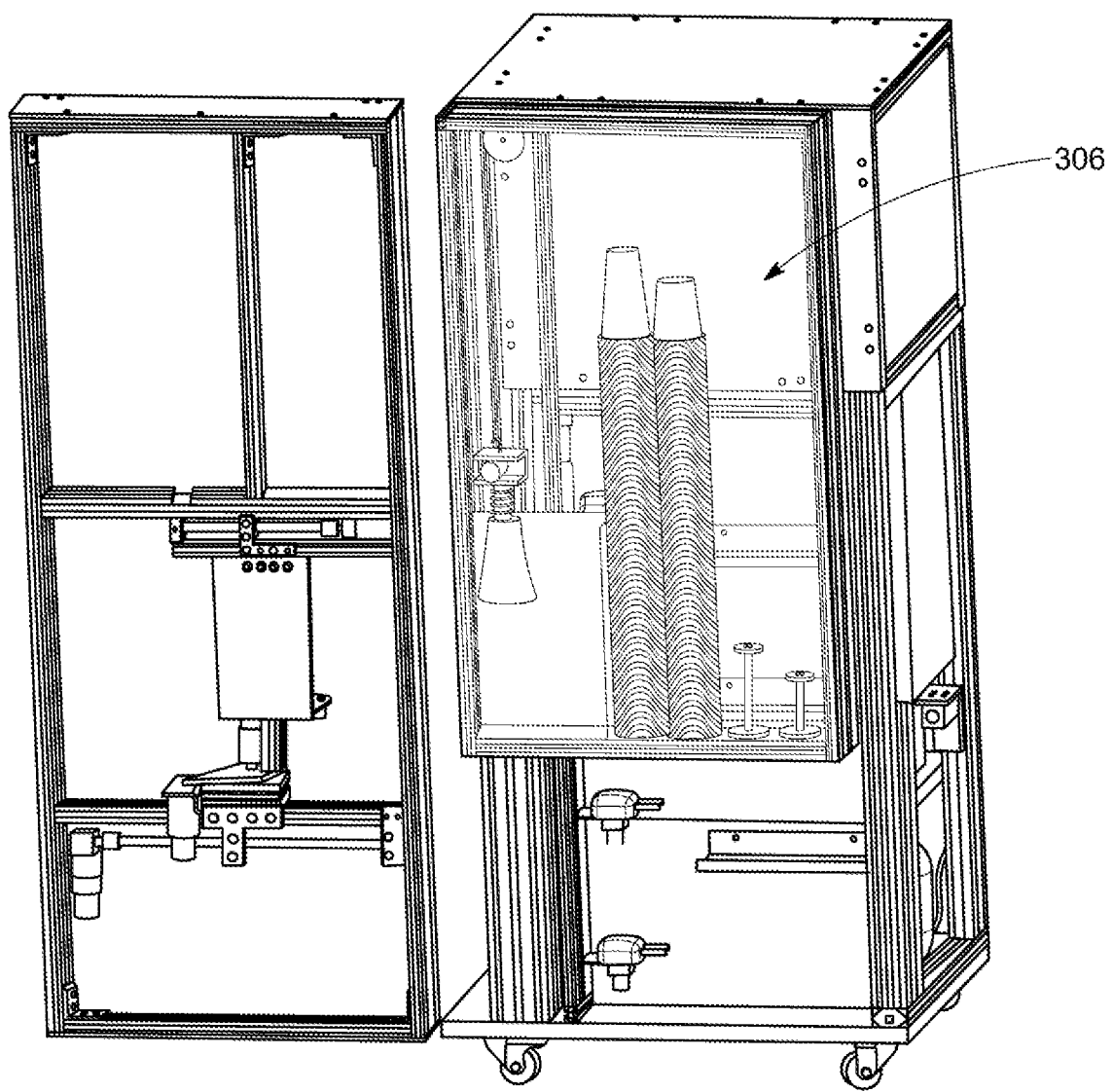
Figure 16C:
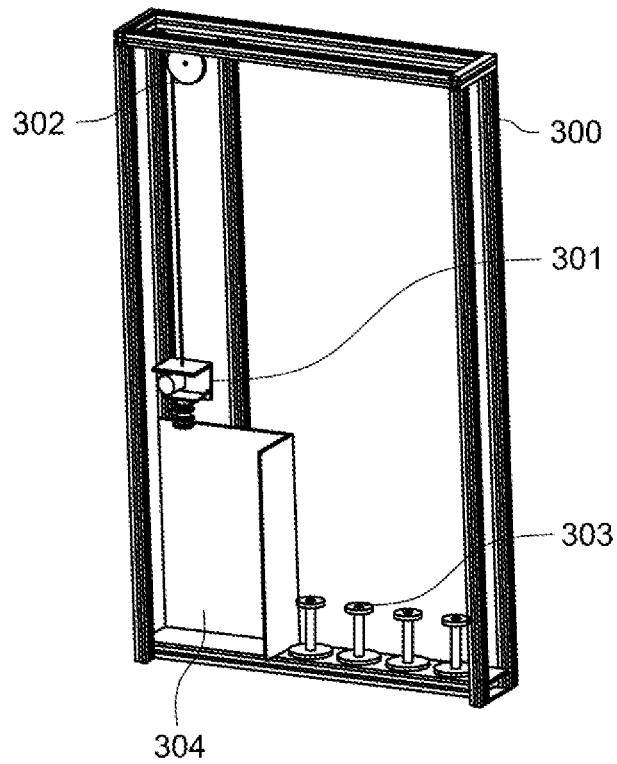
Figure 16D:
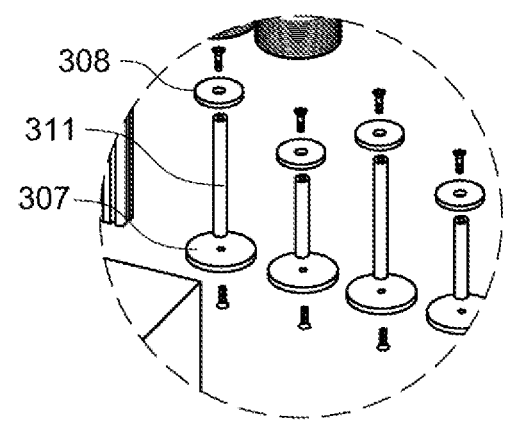
Figure 16E:
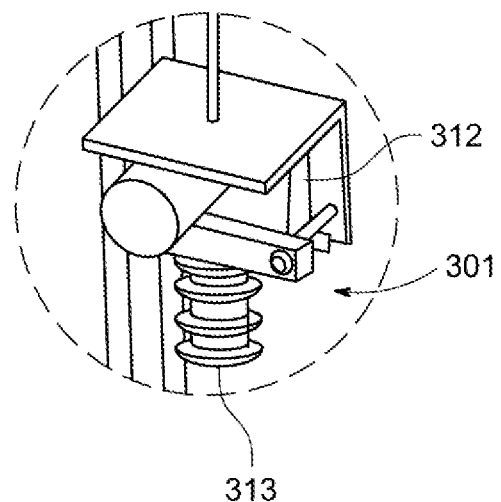
Figure 16F:
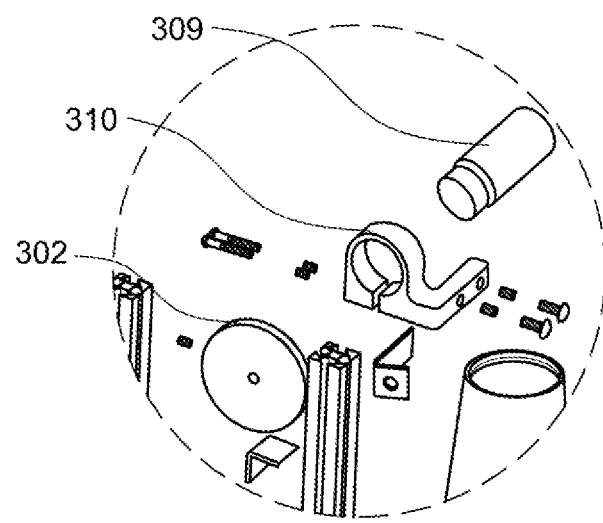

FIGS. 16 through 16-F Illustrate another embodiment of a modular robotic cup dispensing unit in accordance with aspects of the present disclosure. In this second embodiment, different size cups may be stacked, and retrieved based on the customer product choice.

FIG. 16-A illustrates the dispenser showing a stack of cups and the release of a cup at the retrieval chamber. FIG. 16-B illustrates the robotic cup dispensing unit attached to an outer side of the frame (1) with its transparent door in a closed position.

FIGS. 16-C through 16-F illustrates individual components of the modular robotic cup dispensing unit. FIG. 16-D Illustrates cup bases for stacking the cups in the dispenser where the circumference of the upper component is smaller than the circumference of the base component and in direct relation to the cup inner cavity and formation. FIG. 16-E illustrates a suction head used in the robotic cup dispenser, where a miniature DC suction device is connected to miniature suction cups and travels vertically on an 80/20 linear motion track. FIG. 16-F illustrates an elevator motor assembly used in the robotic cup dispenser with its encoder motor, pulley system and assembly. The encoder motor may communicate to the computer controller of the system its encoder position in retrieving a cup, and thereby notify as to the quantity of cups left. When the encoder motor of the elevator reached a predetermined programmed position, which is noted as no cups left, it will report such notification to the main computer controller which will skip that column and notify an operator of the need and quantity of cups to replenish the machine with via the Server.

A second approach for cups left detection employs an infrared sensor at every stack. When one of the sensors no longer senses cups, it will notify the computer controller of the empty column.

Figure 17:
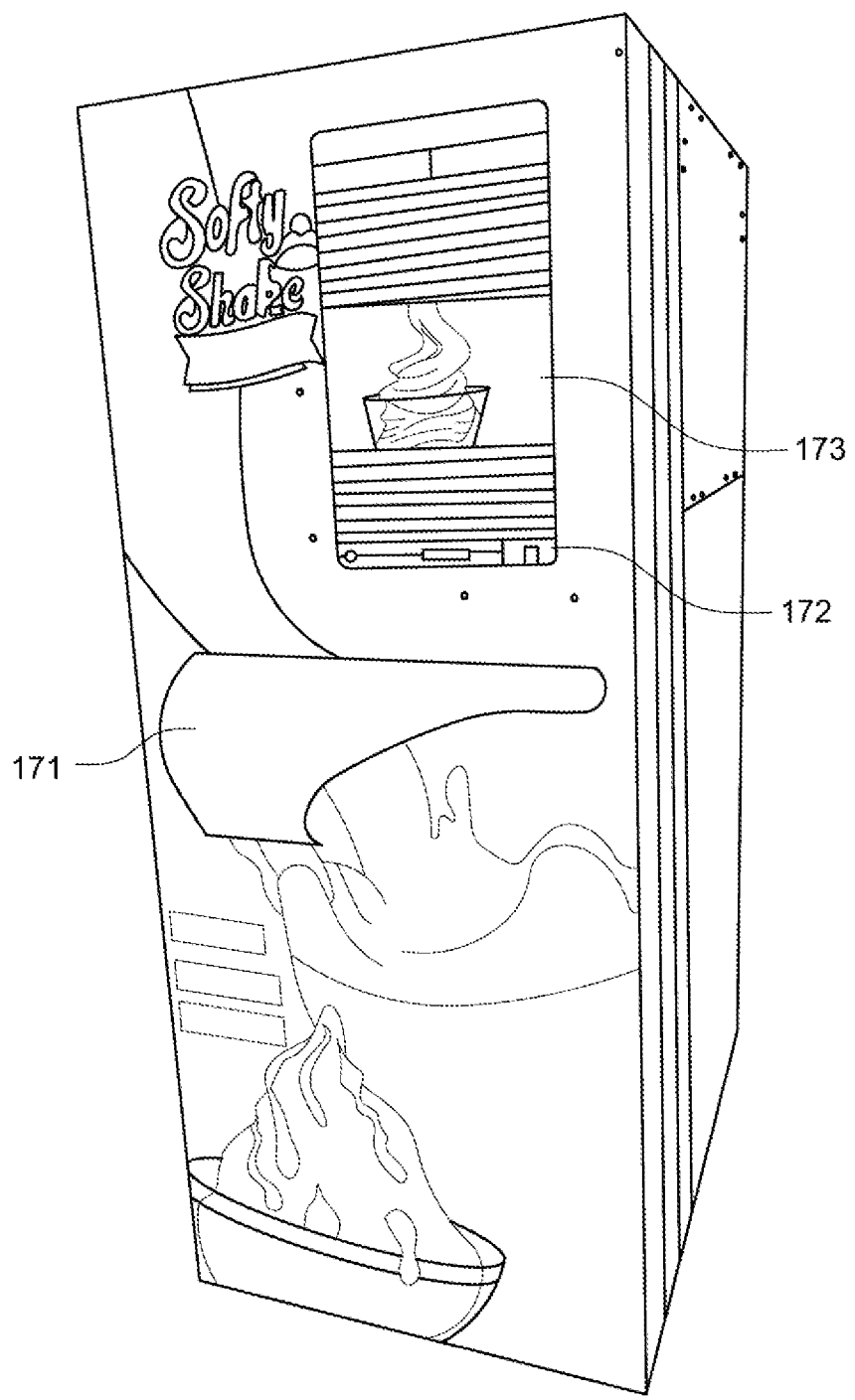
FIG. 17 provides a schematic diagram depicting the front view of the automated vending kiosk of FIG. 4-H, with a front door of the kiosk in a closed position.

FIG. 17 depicts a front view of another front door of the automated vending kiosk of FIG. 14, with the front door of the kiosk in a closed position. The front door as depicted is exemplary, and could be configured in an alternate form that is consistent with the present disclosure. In FIG. 17, viewing window (171) includes a horizontal moving delivery door for delivering a dispensed ice cream cup or milk shake cup to a consumer. A touch screen (173) allows the consumer to make his or her vending selections. A temperature display (172) displays a temperature measured by a temperature sensor in the refrigeration compartment of the kiosk. The display enables the consumer to confirm that the ice cream supply that is being dispensed is being kept at a proper temperature and safe to consume.

Additional aspects of the present disclosure that can be described with reference to the Figures include the following:

The SOFTY SHAKE is comprised of 3 principal Actuator type linear tracks:
  a principal actuator track (418) which travels horizontally,
  an elevator actuator track (417) which travels vertically, and
  a cleaning receptacles actuator track (421) that travels vertically.

The rotating arm 40(9), which moves to receive a cup from one of the cup dispensers, then rotates to receive soft serve from the ice cream machine. The rotating arm (409) also rotates outside the machine through the delivery door opening to serve a finished milk shake or ice cream to the consumer.

A cup holder (411) with a swivel type base (410) is situated at the end of the Rotating Arm.

A dual size cup dispenser (450, 452) has a step (51), enabling the taller 16 oz. milk shake cups (453) to be stepped up to make for a difference in height with the 10 oz. soft-serve ice cream cups (454).

A commercial milk shake mixer (437) is provided with a spring loaded top plate (430) which secures the cup and the contents while being mixed without any spillage. The top plate is cleaned with hot water along with the mixer whisk (436), through 3-way split water manifold (434).

The elevator actuator (417) has sensors in 3 positions. The actuator (417) may work with an encoder as well. When arm (409) reaches the middle of the three sensors it stops, and a cup is pressured against the spring loaded top plate (430). A function of top plate (430) is to secure the cup from rotating while the mixer (437) is vigorously mixing the soft serve ice cream contained in the cup with added milk and flavoring.

The top plate (430) preferably contains quick-connect threaded inserts (433, 433A, 433B.) which allow for the insertion of the milk hose, coffee hose, and water mixer cleaning hose (432) Optionally, additional flavoring threaded inserts may be added to flavor the milk as it is added to the soft serve ice cream in the cup. In addition or alternatively, an additional hot water line may be added, for example, to mix Columbian coffee concentrate to the ice cream to produce a Columbian milk shake.

The top plate (430) is situated on a miniature linear track and carriage (4 31B), and two tension springs (431), on each side of carriage (431B), act against the linear movement thus creating pressure against the cup.

The refrigeration compartment of the kiosk is further described according to the following aspects of the present disclosure:

A SOFTY SHAKE refrigeration compartment is built into the 80/20 structural frame (470). The refrigeration compartment will sturdily carry 20-25 Gallons of Soft serve mix and Milk, weighing approximately 220 lbs.

The refrigeration compartment includes double walls that are insulated with high density foam, and polycarbonate lining with stainless steel on the outer and inner surfaces. A portion of the 80/20 aluminum frame (470) is refrigerated by the refrigeration equipment, including the portion of the frame that is situated directly underneath the refrigeration compartment. The bottom of the refrigerated compartment is composed of 1" PVC cut to shape around the hopper of the soft serve machine. All hoses coming from. Bag-N-Box ice cream and milk mix are preferably refrigerated fur optimal freshness of the ice cream and milk.

The use of a large refrigeration deck and large evaporator in the small cavity of the refrigeration compartment maintains the ice cream mix at an optimal temperature. Since the ice cream mix is kept at a very low temperature, it enters the soft serve machine at low temperature (approximately 3° Celsius) it turns into ice cream very quickly, thus allowing for a substantially continuous ice cream output.

The SOFTY SHAKE machine preferably utilizes a single serve commercial ice cream maker with a fairly low output (110 Volts 16 Amp Machine). The level of refrigeration provided by the upper refrigeration compartment allows for a substantially constant ice cream output. This approach in effect turns a relatively low output ice cream machine into a high output ice cream machine without an associated increase in power consumption and size as would be required by a higher-output ice cream maker. For example, in a conventional ordinary soft serve machine delivering a continuous output of soft serve ice cream in 8 to 10 oz. servings, the ice cream maker would typically be a 220 volt machine consuming 22-30 Amps.

Figure 13A:
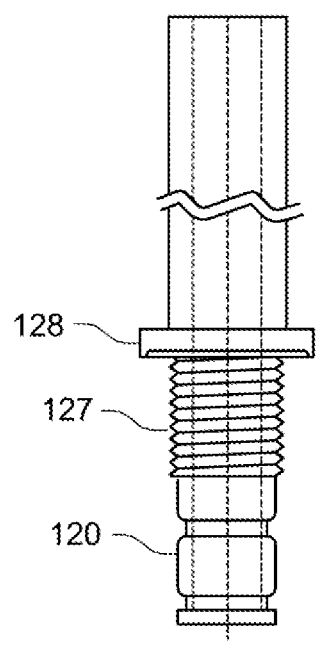

With continued reference to the refrigeration system, aspects of an aerator as depicted by FIGS. 13 and 13A are further described as follows:

A conventional gravity-fed soft serve ice cream machine has an aerator that gets plugged in to a large hopper containing the soft serve mix, and the soft serve flows through the Aerator to get mixed with air.

In accordance with the present disclosure, the kiosk incorporates an aerator that is hermetically coupled to a 16 oz stainless steel cup. That assembly goes inside the hopper in place of the conventional aerator that is incorporated within with the ice cream maker.

A conventional hopper normally contains between 2 to 6 gallons of ice cream. In the present case, the aerator now couple to the stainless steel cup receives the soft serve ice cream mix directly from a sealed Bag-N-Box mix. This substantially reduces the volume of aerated mix to reduce the opportunity for bacteria build up, and reduced the surface area of machine components requiring cleaning and sanitizing from the area enclosing a volume of 2 to 6 gallons to a cleaning area surrounding 16 oz. And to the extent that the machine retains mix that is not dispensed, an associated level of waste for the aerated mix product is at most 16 oz. instead of 2 to 6 gallons. With a reduction in cleaning area comes a significant time reduction for the cleaning sanitizing process.

In accordance with the present disclosure, the aerator operation can be described as follows. The aerator cup includes fill sensor and works together with the Bag-N-Box mix, the cleaning elevator and funnels, a peristaltic pump and a programmable timer as follows:

Upon filling, a timer shuts down production of ice cream to stop the Bag-N-Box mix from flowing to the aerator cup.

After a predetermined time period (for example, 30 minutes), the pump is used to empty ice cream which is in freezing cylinder and 16 oz Aerator cup to prepare to the waste-cleaning funnels.

Chlorinated water is administered from another Bag-N-Box to the aerator cup. A level flow switch measures water level in the cup as it is rinsing the freezing cylinder and Aerator cup.

Upon termination of the Sanitizing process, the Bag-N-Box ice cream system once again turns on, and the ice cream maker begins ice cream production.

Additional aspects of the cleaning system for the SOFTY SHAKE machine can be described as follows. Waste ice cream and chlorinated water from the cleaning operation will be directed to the cleaning funnels in their elevated positions, and suctioned by a commercial macerator pump to street drainage and/or to a portable waste tank (for example, a CAMCO RhinoFLEX Heavy Duty 21 Gallon Portable RV Waste Holding Tank). The macerator pump preferably runs at 12 Gallons a minute. Ice cream provided to the cylinder and aerator cup is expected to total approximately 1 gallon of material. At the beginning of the cleaning cycle, the timer will stop production, and allow approximately 30 minutes for the ice cream to melt so that the procedure can be carried out automatically and hands-free.

The following table lists the reference characters and names of features and elements used herein:

| Ref. No. | Feature or element |
|---|---|
| 1 | Frame |
| 2 | Upper insulated cavity |
| 2-A | Panel |
| 3 | Refrigerated Cavity |
| 4 | Condensing unit |
| 5 | Evaporator |
| 6 | Bag-N-Box ice cream mix system |
| 7 | Inner shelves |
| 8 | Peristaltic pump |
| 9 | Air mixing stainless steel cup |
| 10 | Refrigeration tubes |
| 11 | Lower shelf |
| 12 | Topping dispenser system |
| 13 | Arm |
| 14 | Peristaltic pump |
| 17 | Funnel |
| 18 | Hose |
| 19 | Actuator |
| 20 | Plunger actuator swivel device assembly |
| 21 | Quick release pin |
| 22 | Cavity |
| 22A | Swivel device body |
| 22B | Swivel device cap |
| 23 | Screw |
| 23A | Helicoil |
| 24 | Lever |
| 25 | Flavoring piston/push-to-connect valve |
| 26 | Frozen drink machine |
| 27 | Flavoring box/cabin |
| 28 | Tray |
| 29 | Shelf |
| 30 | Stainless steel skin |
| 31 | Aluminum closure |
| 32 | Framing material |
| 33 | Fixed plate |
| 34 | Base plate |
| 36 | Hot water reservoir |
| 37 | Collecting tray |
| 38 | Drip hose |
| 39 | Power supply |
| 40 | Topping dispensing mechanism |
| 41 | Junction box |
| 42 | Dispensing unit plug |
| 44 | Fan |
| 51 | Smart relay |
| 52, 53 | Relay |
| 54 | Inverter |
| 55 | Grid A/C line |
| 57, 58 | Neutral |

| Ref. No. | Feature or element |
| --- | --- |
| 59, 60 | Leg |
| 61 | X-Y-Z cup transport system |
| 62 | Rotating base |
| 63 | Elevator |
| 64 | Motor |
| 65 | Cup ring |
| 66 | Infrared sensor |
| 67 | Large sprocket |
| 68 | Hall effect reader |
| 68A | Bracket |
| 69 | Magnet ring |
| 70 | Small sprocket |
| 71 | Encoder motor |
| 73 | UTP adapter board |
| 75 | Ice cream machine |
| 76 | Funnel assembly |
| 77 | Funnel face wall |
| 78 | Funnel body |
| 79 | Funnel back wall |
| 80 | Helicoil/insert |
| 81 | Screw |
| 82 | Axis rod |
| 83 | Flap |
| 84 | Screw |
| 85 | Spring latch |
| 86 | Upper body |
| 87 | Screw |
| 91 | Auger |
| 93 | Screw |
| 94 | Star |
| 95 | Push-to-connect fittings |
| 96 | Flavoring plate |
| 97 | Gasket |
| 98 | Upper unit |
| 100 | Helicoil |
| 101 | Ice cream dispensing block |
| 102 | Gasket |
| 103 | Piston |
| 104 | Piston upper portion |
| 105 | Circular channel |
| 106 | Groove |
| 107 | Flavor dispensing plate |
| 107A | Inlet |
| 119 | Outlet perforation |
| 119A | Perforated mix inlet |
| 120 | Aerator lower part |
| 121 | Threaded nut |
| 122 | Aerator |
| 123 | Float switch |
| 124 | Cover |
| 125 | Threaded perforation |
| 125A | Threaded perforation |
| 125B | Threaded perforation |
| 126 | Main perforation |
| 127 | Threaded portion |
| 128 | Flange |
| 130 | Door panel |
| 130A | Door panel |
| 171 | Viewing window |
| 172 | Temperature display |
| 173 | Touch screen |
| 408 | Motor |
| 409 | Rotating arm |
| 410 | Rotating base |
| 411 | Cup holder ring |
| 412 | Cup |
| 413 | Circular base |
| 414 | Motor |
| 415 | Motor bracket |
| 415A | Stainless steel cover |
| 416 | Linear carriage |
| 416A | Bracket |
| 417 | Linear elevator track |
| 417a | Angle bracket |
| 418 | Horizontal linear track |
| 419 | Hall-effect sensor |
| 420 | Reinforcement angular plate |
| 420A | Connecting plate |
| 421 | Cleaning waste vertical linear track |
| 422 | Cleaning funnel |
| 423 | Bracket |
| 424 | Cleaning funnel |
| 425 | Flex hose |
| 425A | Flex hose |
| 430 | Cup top plate |
| 431 | Tension spring |
| 431A | Bracket |
| 431B | Carriage |
| 432 | Hose |
| 433 | Threaded quick connect |
| 433A | Threaded quick connect |
| 433B | Threaded quick connect |
| 434 | Water manifold |
| 436 | Mixing spindle |
| 437 | Milk shake mixer |
| 438 | Plate |
| 440 | Topping dispensers |
| 450 | Cup ring |
| 451 | Step |
| 452 | Smaller cup dispensing ring |
| 453 | Milk shake cup |
| 454 | Ice cream cup |
| 460 | Removable waste bin |
| 470 | Kiosk frame |
| 480 | Ice cream flavoring plate |

As noted above, while aspects of the present disclosure have been provided with some specific examples and illustrations pertaining to municipal beach badges, those skilled in the art will recognize that the teachings of the disclosure are not restricted to these specific examples and illustrations. Rather, the teachings are more broadly applicable to a variety municipal badging and similar applications. For example, and with reference to the power management subsystem described with reference to FIG. 7-B, it will be apparent to one of skill in the art that variants of the systems and subsystems described herein are possible and within the scope of the intended disclosure. For example, it is possible that the subsystem of FIG. 7-B for controlling power supplied to the heating and refrigeration units may be implemented with components other than the master/slave relays and controller described herein. In particular, the master/slave arrangement shown herein could be replaced with a two relay subsystem embedding the control operation performed by the master relay of the disclosed system within the control logic executed by the eon roller/system computer.

I claim:

1. A method for sharing power from a conventional commercial A/C power source among a plurality of loads generated by a plurality of operating components in a food service vending machine, wherein a first one of the plurality of operating components generates a load drawing substantially more current during a start-up condition than during a running condition, the method comprising the steps of:
coupling the first operating component to the A/C power source via a master relay, wherein the master relay is controllable by a controller to provide power from the A/C power source to the first operating component in a closed operating mode and remove power provided by the A/C power source from the first operating component in an open operating mode;
coupling the other operating components to respective slave relays, wherein each of the slave relays is controllable by one or more of the master relay or the controller to provide power from the A/C power source to a respective operating component in a closed operating mode and remove power from the respective operating component in an open operating mode;

coupling a current sensor to the A/C power source, wherein the current sensor is in communication with the controller and configured to sense a current drawn on the A/C power source; and configuring at least one slave relay in the open mode when the controller determines that a first value of the sensed current indicates a start-up condition for the first operating component.

2. The method of claim 1, further comprising the step of: configuring the least one slave relay in the closed mode when the controller determines that a second value of the sensed current indicates a running condition for the first operating component.

3. The method of claim 2, wherein the at least one slave relay is associated with a respective other one of the operating units and selected according to a predetermined priority for that operating unit, the predetermined priority being stored by a memory that is accessible to the controller.

4. The method of claim 1, further comprising the step of: configuring at least another one of the slave relays in the closed mode when the controller determines that a third value of the sensed current indicates that the first operating component is inactive.

5. The method of claim 1, wherein the first operating component comprises a soft-serve ice cream machine.

6. The method of claim 5, wherein the other operating components include at least two or more of an ice cream refrigeration unit, a hot water heater or a soda dispensing machine.

7. The method of claim 6, wherein the controller comprises a watchdog module for detecting an abnormality in the operation of the first operating component, and wherein the watchdog module causes the master relay to remove power from the first operating component upon detecting the abnormality.

8. The method of claim 7, wherein the abnormality comprises a second value of the sensed current that exceeds a predetermined limit stored by a memory that is accessible to the controller.

9. The method of claim 7, wherein the abnormality comprises a second value of the sensed current that falls below a predetermined limit stored by a memory that is accessible to the controller.

10. The method of claim 7, wherein the abnormality comprises a duration of the start-up and running conditions for the first operating component by the controller that either individually of in sum exceed a predetermined limit stored by a memory that is accessible to the controller.

11. A device for sharing power from a conventional commercial A/C power source among a plurality of loads generated by a plurality of operating components in a food service vending machine, wherein a first one of the plurality of operating components generates a load drawing substantially more current during a start-up condition than during a running condition, the device comprising:

a controller;

a master relay coupling the first operating component to the A/C power source, wherein the master relay is controllable by the controller to provide power from A/C power source to the first operating component in a closed mode and remove power provided by the A/C power source from first operating component in an open mode;

a plurality of slave relays each coupled to respective ones of the other operating components and controllable by one or more of the master relay or the controller to permit the AJC power source to power a respective operating component in a closed mode and to remove power from the respective operating component in an open mode; and a current sensor in communication with the controller and configured to sense a current drawn on the A/C power source, wherein one or more of the master relay or the controller is operative to configure the at least one slave relay in the open mode upon determining that a first value of the sensed current indicates a start-up condition for the first operating component.

12. The device of claim 11, wherein the first operating component comprises a soft-serve ice cream machine.

13. The device of claim 12, wherein the other operating components include at least two or more of an lee cream refrigeration unit, a hot water heater or a soda dispensing machine.

14. The device of claim 13, wherein the other operating components include an ice cream refrigeration unit and a hot water heater, for which power supplied by the A/C power source is further controlled be respective thermostat devices for maintaining respective temperature ranges internally to the ice cream refrigeration unit and the hot water heater.

15. The device of claim 11, wherein the current sensor comprises a Hall effect sensor.

16. A food service vending machine having a power management device for sharing power from a conventional commercial A/C power source among a plurality of loads generated by a plurality of operating components of the food service vending machine, wherein a first one of the plurality of operating components generates a load drawing substantially more current during a start-up condition than during a running condition, the device comprising:

a controller;

a master relay coupling the first operating component to the A/C power source, wherein the master relay is controllable by the controller to provide power from A/C power source to the first operating component in a closed mode and remove power provided by the A/C power source from first operating component in an open mode;

a plurality of slave relays each coupled to respective ones of the other operating components and controllable by one or more of the master relay or the controller to permit the A/C power source to power a respective operating component in a closed mode and to remove power from the respective operating component in an open mode; and a current sensor in communication with the controller and configured to sense a current drawn on the A/C power source, wherein one or more of the master relay or the controller is operative to configure the at least one slave relay in the open mode upon determining that a first value of the sensed current indicates a start-up condition for the first operating component.

17. The device of claim 16, wherein the first operating component comprises a soft-serve ice cream machine.

18. The device of claim 17, wherein the other operating components include at least two or more of an ice cream refrigeration unit, a hot water heater or a soda dispensing machine.

19. The device of claim 16, wherein the current sensor comprises a Hall effect sensor.

20. The device of claim 17, wherein the other operating components include an ice cream refrigeration unit and a hot water heater, for which power supplied by the AJC power source is further controlled be respective thermostat devices for maintaining respective temperature ranges internally to the ice cream refrigeration unit and the hot water heater.

\* \* \* \* \*